US011121635B2

(12) United States Patent
Khamesra et al.

(10) Patent No.: US 11,121,635 B2
(45) Date of Patent: Sep. 14, 2021

(54) ACCURATE VALLEY DETECTION FOR SECONDARY CONTROLLED FLYBACK CONVERTER

(71) Applicant: Cypress Semiconductor Corporation, San Jose, CA (US)

(72) Inventors: Arun Khamesra, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/849,735

(22) Filed: Apr. 15, 2020

(65) Prior Publication Data
US 2020/0412264 A1 Dec. 31, 2020

Related U.S. Application Data

(63) Continuation of application No. 16/455,568, filed on Jun. 27, 2019, now Pat. No. 10,651,753, which is a
(Continued)

(51) Int. Cl.
*H02M 3/335* (2006.01)
*H02M 1/08* (2006.01)
*H02M 1/00* (2006.01)

(52) U.S. Cl.
CPC ....... *H02M 3/33592* (2013.01); *H02M 1/083* (2013.01); *H02M 3/33515* (2013.01); *H02M 3/33523* (2013.01); *H02M 2001/0009* (2013.01)

(58) Field of Classification Search
CPC ......... H02M 3/33515; H02M 3/33523; H02M 3/33592; H02M 1/08; H02M 1/083; H02M 2001/0009; Y02B 70/1475
(Continued)

(56) References Cited

U.S. PATENT DOCUMENTS 5,485,361 A 1/1996 Sokal
6,381,152 B1 4/2002 Takahashi et al.
(Continued)

FOREIGN PATENT DOCUMENTS

JP 6336784 B2 6/2018
WO 2009010802 A2 1/2009
WO 2018213015 A1 11/2018

OTHER PUBLICATIONS

"UCC24630 Synchronous Rectifier Controller With Ultra-Low-Standby Current" Texas Instruments, Mar. 2015, pp. 1-41; 41 pages.
(Continued)

*Primary Examiner* — Yemane Mehari

(57) ABSTRACT

An AC-DC converter with synchronous rectifier (SR) architecture and method for operating the same are described. Generally, a secondary side IC controller of the AC-DC converter includes a SR-SNS pin coupled to a peak-detector block, a zero-crossing block, and a calibration block. The calibration block is configured to: measure a loop turn-around delay (Tloop), a time (Tpkpk) between two successive peak voltages detected on the SR-SNS pin, and a time (Tzpk) from when the voltage sensed on the SR-SNS pin crosses zero voltage to when a peak voltage is detected on the SR-SNS pin; and set timing for a signal to turn on a power switch in a primary side of the AC-DC converter based at least on Tloop, Tpkpk, and Tzpk.

20 Claims, 15 Drawing Sheets

Related U.S. Application Data continuation-in-part of application No. 16/453,705, filed on Jun. 26, 2019, now Pat. No. 10,554,140.

(58) Field of Classification Search
USPC .......................................... 363/21.12–21.18
See application file for complete search history.

(56) References Cited

U.S. PATENT DOCUMENTS

| | | | |
|---|---|---|---|
| 6,456,511 | B1 | 9/2002 | Wong |
| 6,504,267 | B1 | 1/2003 | Giannopoulos |
| 6,671,189 | B2 | 12/2003 | Jansen et al. |
| 8,581,505 | B2 | 11/2013 | Melanson |
| 8,792,257 | B2 | 7/2014 | Berghegger |
| 8,964,420 | B2 * | 2/2015 | Zhang ............... H02M 3/33592 363/21.12 |
| 9,093,903 | B2 | 7/2015 | Swaminathan et al. |
| 9,325,246 | B1 | 4/2016 | Peng et al. |
| 9,379,625 | B2 | 6/2016 | Kesterson et al. |
| 9,502,985 | B2 | 11/2016 | Werner et al. |
| 9,998,014 | B2 | 6/2018 | Yao et al. |
| 10,554,140 | B1 * | 2/2020 | Khamesra ......... H02M 3/33592 |
| 10,651,754 | B1 | 5/2020 | Murugesan et al. |
| 2009/0268494 | A1 | 10/2009 | Hu |
| 2010/0027298 | A1 * | 2/2010 | Cohen ............... H02M 3/33592 363/21.14 |
| 2012/0250366 | A1 | 10/2012 | Wang et al. |
| 2014/0078788 | A1 | 3/2014 | Yao et al. |
| 2014/0204624 | A1 | 7/2014 | Djenguerian et al. |
| 2014/0254202 | A1 | 9/2014 | Balakrishnan et al. |
| 2015/0103567 | A1 * | 4/2015 | Wang ................ H02M 3/33592 363/21.13 |
| 2015/0280573 | A1 | 10/2015 | Gong et al. |
| 2016/0111961 | A1 | 4/2016 | Balakrishnan et al. |
| 2016/0359421 | A1 * | 12/2016 | Lin .................... H02M 3/33523 |
| 2017/0033698 | A1 * | 2/2017 | Vemuri ............. H02M 3/33523 |
| 2018/0159434 | A1 | 6/2018 | Werner et al. |
| 2018/0351462 | A1 | 12/2018 | Li et al. |
| 2018/0358902 | A1 * | 12/2018 | Duvnjak ........... H02M 3/33592 |
| 2019/0149056 | A1 | 5/2019 | Zheng et al. |

OTHER PUBLICATIONS

USPTO Non-Final Rejection for U.S. Appl. No. 16/453,705 dated Aug. 21, 2019, 5 pages.
USPTO Non-Final Rejection for U.S. Appl. No. 16/455,568 dated Aug. 22, 2019, 9 pages.
USPTO Notice of Allowance for U.S. Appl. No. 16/453,705 dated Oct. 3, 2019, 10 pages.
USPTO Notice of Allowance for U.S. Appl. No. 16/455,568 dated Mar. 4, 2020; 9 pages.
USPTO Notice of Allowance for U.S. Appl. No. 16/455,568 dated Nov. 29, 2019; 9 pages.
USPTO Notice of Allowance for U.S. Appl. No. 16/578,707 dated Feb. 3, 2020; 9 pages.
USPTO Notice of Allowance for U.S. Appl. No. 16/579,339 dated Feb. 10, 2020; 9 pages.
USPTO Notice of Allowance for U.S. Appl. No. 16/740,189 dated Oct. 1, 2020, 9 pages.
USPTO Non-Final Rejection for U.S. Appl. No. 16/849,775 dated May 3, 2021; 10 pages.
USPTO Notice of Allowance for U.S. Appl. No. 16/883,890 dated Jun. 24, 2021; 9 pages.

* cited by examiner

ACCURATE VALLEY DETECTION FOR SECONDARY CONTROLLED FLYBACK CONVERTER

CROSS-REFERENCE TO RELATED APPLICATIONS

This application is a continuation of U.S. application Ser. No. 16/455,568, entitled Accurate Valley Detection for Secondary Controlled Flyback Converter, filed Jun. 27, 2019, which is a continuation-in-part of U.S. application Ser. No. 16/453,705, entitled AC-DC Converter with Secondary Side-Control and Synchronous Rectifier Sense Architecture, filed Jun. 26, 2019, now U.S. Pat. No. 10,554,140, issued Feb. 4, 2020, both of which are incorporated by reference herein.

TECHNICAL FIELD

This disclosure relates generally to AC-DC power converters, and more particularly to flyback converters including a secondary side controller and synchronous rectifier sense architecture and methods of operating the same.

BACKGROUND

AC-DC converters convert power from an alternating current (AC) source to a direct current (DC) at a specified voltage level. AC-DC converters using secondary side control can deliver power more efficiently for a given size and weight, and are therefore widely used in portable electronic devices. Generally, an AC-DC converter transfers power from an AC input connected or coupled to a primary side of a transformer to a DC output coupled to a secondary side of the transformer.

A simplified schematic block diagram of one such AC-DC converter including a synchronous rectifier (SR) sense architecture is shown in FIG. 1. Referring to FIG. 1 the AC-DC converter 100, generally includes a transformer 102, an active rectification element or power switch (PS), such as a PS field effect transistor (PS_FET 104) on a primary side of the transformer, a synchronous rectifier (SR), such as a SR field effect transistor (SR_FET 106) on a secondary side of the transformer, and an output filter or capacitor 108. In operation the PS_FET 104 switches power to the primary side on or off in response to a signal from a primary side controller 110. In secondary side controlled converters a secondary side controller 112 coupled to a drain node (SR_DRAIN 114) and gate of the SR_FET 106 senses voltage on the SR_DRAIN and turns the SR_FET on and off in response to sensed voltage peaks, and negative and zero-crossings.

In a flyback converter, the primary side controller 110 receives a signal from the SR_FET 106 or secondary side controller 112 over a feedback or flyback path 116. During the time in which the PS_FET 104 is on or closed with SR_FET 106 being off or open, the AC-DC converter 100 is said to be operating in fly-back mode, and a magnetic field builds up in the transformer 102 while a current on the primary side increases linearly. When the PS_FET 104 is off or opened, and SR_FET 106 is on or closed, the AC-DC converter 100 transfers the power to secondary side, in which the magnetic field begins to collapse and the secondary side current decreases steadily, but gradually as power is given to the Cout 108 connected to the output until a point is reached at which there is substantially zero current flow in the secondary.

One problem with previous generations of AC-DC converters using SR-SNS architecture is that depending on the turn-ratio (N:1) of the transformer 102 (typically 4:1), a voltage on the drain node 114 of the SR_FET 106 can go beyond the 1/Nth of rectified AC input voltage, often as high as 115V for 230V AC input. This in turn requires the use of a relatively large and expensive high-voltage FETs on SR_DRAIN node as well as additional electrostatic discharge (ESD) circuitry in the secondary side controller 112 to safely couple this voltage from the drain node 114 to the secondary side controller.

Prior approaches to at least partially addressing the above problem rely on use of a large, high power FET made with greater than 150V tolerant technology to sense SR_DRAIN node inside Secondary Controller 112 or use of external clamping circuits 118 to clip the input to the secondary side controller 112. These approaches have not been wholly satisfactory as the secondary side controller 112 is often realized as an integrated circuit (IC), and the use an external clamping circuit 118 to clip the input to the IC requires additional package pins and external components and connections for peak-detecting and feed-forward (feed-fwd) sensing because externally clipping the voltage on the SR_DRAIN 114 interferes with these detections. Thus, use of external clamping circuits 118 increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters.

Another problem with previous generations of AC-DC converters 100, and secondary side controlled flyback converters in particular, arises due to requirement of detection of a valley or minimum voltage on the primary. In AC-DC converters 100 the PS_FET 104 should be turned on at the valley to minimize conduction loss and thereby achieve optimal efficiency. However, in secondary side controlled flyback converters 100, such as shown in FIG. 1, because the valley on the primary is detected as a peak on secondary side, which corresponds to a peak on secondary, detection of the peak needs to be done accurately. This additional requirement of peak detection results in additional components to be added on SR_DRAIN node, as the external clamping circuit 118 will not allow peaks on SR_DRAIN to be sensed accurately. Hence, additional component is required to be added on SR_DRAIN 114 for example Cpd is added in AC-DC converter 100, shown in FIG. 1 Thus, use of external peak-detect component (Cpd) increases both the size and complexity of the IC and the number of package-pins of the IC dedicated to SR sensing. This in turn increases the bill of materials (BOM) needed for manufacturing the AC-DC converter 100 and the size of the IC on which the secondary side controller 112 is fabricated, both of which tend to increase cost while decreasing yield and utility of the AC-DC converter 100 in applications requiring compact power converters. Consequently, with previous generations of flyback converters 100, it is not possible to hit the valley accurately resulting in loss of efficiency.

Accordingly, there is a need for an AC-DC converter with secondary side control and SR-SNS architecture and methods for operating the same that reduces cost and complexity without affecting performance. There is a further need for a flyback converter with secondary side control and SR-SNS architecture and methods for operating the same that provides accurate valley detection for improved efficiency.

SUMMARY

AC-DC converters with secondary side control and synchronous rectifier (SR) architecture and methods of operating the same are provided for reducing the cost, complexity and size of the converter while improving efficiency.

In one embodiment, the secondary side controller includes a zero-crossing detector block, a negative-sensing block, and a peak-detector block integrated or packaged as a single integrated circuit (IC), and coupled to a secondary side of the converter through a single SR-SNS (SR_SNS) pin through which the IC is coupled to a drain of a synchronous rectifier (SR), such as a SR-field effect transistor (SR_FET). Generally, the single SR-SNS pin has a maximum input voltage less than a maximum rectified AC input voltage to a secondary side of the AC-DC converter, and is coupled to the drain of the SR through a voltage divider circuit including circuit elements both internal and external to the IC.

In another aspect or embodiment, a secondary side controlled flyback converter and methods of operating the same are provided to improve accuracy of valley detection in the primary, and efficiency of the converter. In this embodiment, the IC of the secondary side controller includes a single SR-SNS pin coupled to a drain of a SR on a secondary side of the converter to sense a voltage on the drain, and a power switch (PS) drive pin coupled to a PS on a primary side to turn on the PS in response to a number of measurements based on the voltage sensed on the drain of the SR. The IC further includes a calibration block configured to execute a calibration step or cycle to measure a loop turn-around delay (Tloop) between when an actual valley or minimum in rectified AC input to the primary side and a peak, which corresponds to the valley, being sensed on the drain of the SR on the secondary side, and set timing for a signal to turn on the PS during cycles following calibration. Generally, the calibration cycle is performed once immediately following power up of the converter, and firmware in the calibration block or secondary controller can set a precise timing for turning on the PS in subsequent cycles with reference to a zero-crossing as sensed by as sensed on the drain of the SR on the secondary side controller. Since turning on of the PS of the primary side causes the voltage being sensed on the drain of the SR on the secondary side to go up, Tloop can be measured by hardware in the calibration block by measuring delay from a time when a turn-on signal is sent to the PS in the primary to a time when the voltage on the SR drain goes up, that is when a zero-crossing detected when the converter is operating in continuous conduction (CCM) mode.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

Figure 1:
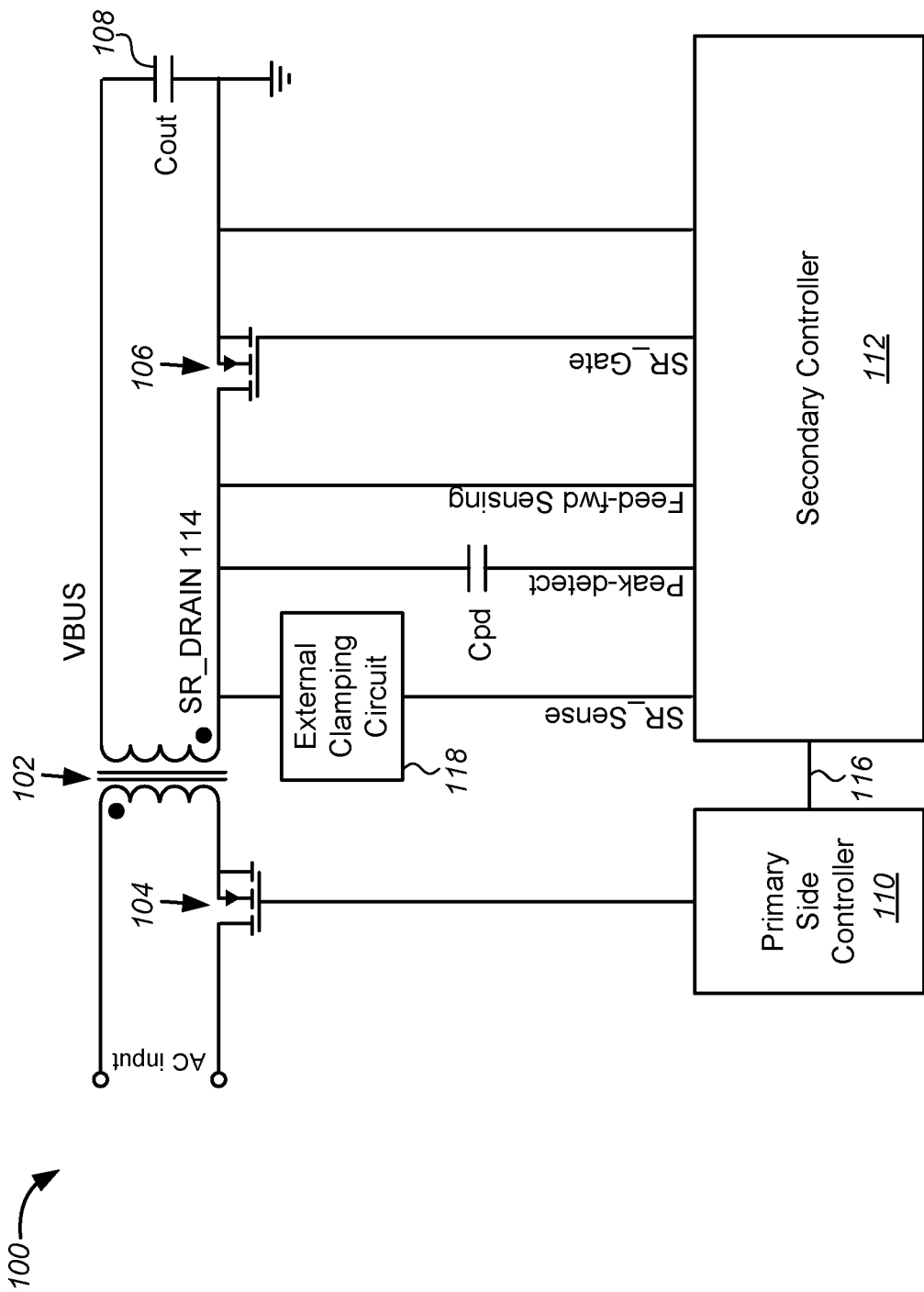
FIG. 1 is a schematic block diagram illustrating a AC-DC converter for which a secondary-side controller and synchronous rectifier (SR) architecture of the present disclosure is particularly useful.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

AC-DC converters with secondary side control and synchronous rectifier (SR) architecture including a single SR- SNS pin (SR_SNS) and methods of operating the same are disclosed for reducing the cost, complexity and size of the converter while improving efficiency. The system and methods of the present disclosure are particularly useful in or with AC-DC flyback converters to improve valley detection for improved control of a primary side power switch or primary FET by a secondary side controller to improve efficiency of the converter.

Figure 2A:
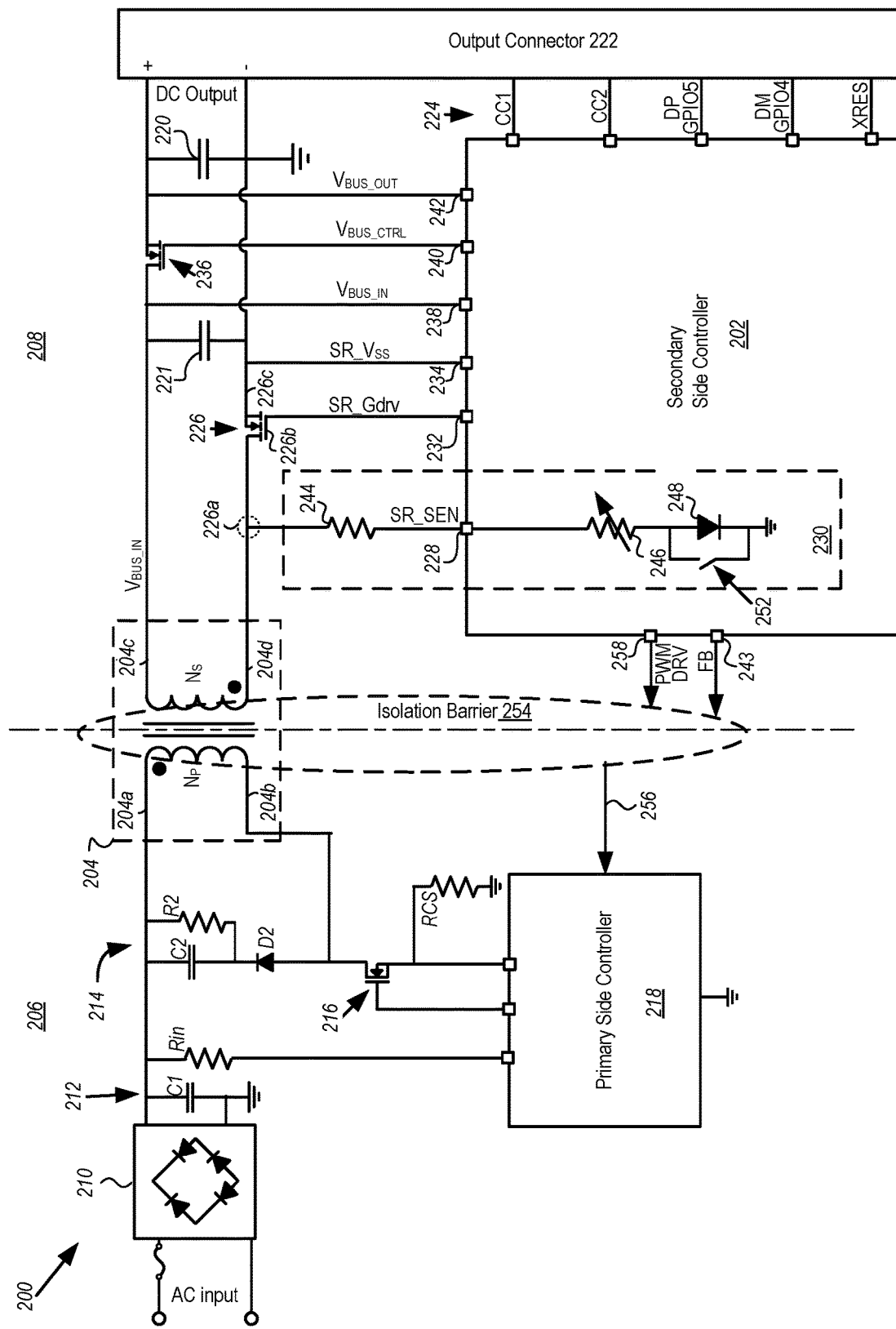
FIG. 2A is a schematic block diagram depicting an embodiment of an AC-DC converter including a secondary-side controller and SR architecture in accordance with the present disclosure.

An embodiment of an AC-DC converter including a secondary-side controller and SR architecture in accordance with the present disclosure will now be described with reference to FIGS. 2A through 2E. FIG. 2A is a schematic block diagram of an AC-DC converter 200 including an embodiment of a secondary-side controller 202 and having an SR architecture in accordance with the present disclosure. Referring to FIG. 2A, the AC-DC converter 200 generally includes a transformer 204 having a primary winding (NP) on a primary side 206 electrically connected or coupled to an AC input, and a secondary winding (NS) on a secondary side 208 coupled to a DC output.

On the primary side 206 a rectifying circuit, such as a bridge rectifier 210, and one or more input filters 212, 214, coupled to a first terminal 204a of the transformer 204 rectify an AC input voltage and supply input power to the primary winding of the transformer 204. The input filters can include a first input filter 212 having a capacitor (C1) coupled to or across an output of the rectifier 210, and a second, RC filter 214 including a resistor or resistive element (R2) and a capacitor (C2) coupled in parallel between the first terminal 204a of the transformer 204 and a cathode of a diode or rectifier (D2) having an anode coupled to a second terminal 204b of the transformer. Generally, as in the embodiment shown, the AC-DC converter 200 further includes a power switch (PS 216), such as a primary field effect transistor (PR_FET), having a first or drain node coupled to the second terminal 204b of the transformer 204, a second or gate node coupled to a primary side controller 218, and a third or source node coupled to the primary side controller and, through a current sensing element, such as a resistive element (RCS) to ground to sense a primary side current (I_primary) flowing through the primary winding when the PS 216 is closed or conducting. Generally, as in the embodiment shown, the primary side controller 218 is further coupled to the first terminal 204a of the transformer 204 through a resistive element (Rin) to receive a voltage or signal equal or proportional to the rectified AC input voltage.

On the secondary side 208 the AC-DC converter 200 includes a filter capacitor 221 coupled between a third terminal 204c of the transformer 204 and an electrical ground or ground terminal, and an output capacitor 220 coupled between a third terminal 204c of the transformer 204 and an electrical ground provide a DC output voltage to an output interface or connector 222. Generally, as in the embodiment shown the output connector 222 is further coupled to the secondary side controller 202 through a number of communication channels 224 to support various charging protocols. Suitable output connectors 222 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 200 is compliant with the USB protocol to provide a DC output voltage of about 3.3 VDC to about 21.5 VDC at a current of from about 0 to about 3000 milliamps (mA).

In accordance with the present disclosure, the AC-DC converter 200 further includes on the secondary side 208 a synchronous rectifier (SR 226), such as a synchronous rectifier field effect transistor (SR_FET), coupled between a fourth terminal 204d of the transformer 204 and the ground terminal of the DC output. The SR 226 includes a first or drain node 226a coupled to the fourth terminal 204d of the transformer 204 and the secondary side controller 202 to sense a voltage on the drain of the SR; a second or gate node 226b coupled to the secondary side controller to drive or control the SR; and a third or source node 226c coupled to the secondary side controller and the ground terminal of the DC output.

In certain embodiments, such as that shown, the secondary side controller 202 is realized or implemented as single integrated circuit (IC), or as a number of ICs packaged in a single IC package, and the drain node 226a is coupled to a single SR-SNS pin 228 of the IC through a voltage divider 230 including circuit elements both internal and external to the IC of the secondary side controller. The gate node 226b of the SR 226 is coupled to the secondary side controller 202 through a SR-drive pin 232, and the source node 226c of the SR is coupled to the secondary side controller through a SR-Vss (ground voltage level) pin 234.

Optionally, as in the embodiment shown, the secondary side further includes an additional or secondary switch (SS) 236, such as a NFET, coupled between the third terminal 204c of the transformer 204 and a positive DC output to enable to the secondary side controller 202 to turn off the DC output to protect against over voltage and/or under voltage conditions. The SS 236 includes a source node coupled to a voltage bus in pin ($V_{BUS\_IN}$) 238 of the secondary side controller 202; a gate node coupled to a voltage bus control pin ($V_{BUS\_CTRL}$) 240 to drive or control the SS; and a drain node coupled to a voltage bus out pin ($V_{BUS\_OUT}$) 242 and to the positive terminal of the DC output.

The voltage divider 230 includes an external resistive element 244, an internal resistive element 246 and an internal rectifier 248. Although shown schematically as a diode, it will be understood that this need not be case in every embodiment, and that internal rectifier 248 may be a PN diode (as shown), or alternatively, a synchronous diode or a FET configured or connected to function as a diode. The configuration or placement of the internal rectifier 248, i.e., connected with a cathode to ground, ensures that during negative sensing or zero-crossing operations there is substantially no current flow through the voltage divider 230, thereby allowing the full, undivided negative voltage on the drain node 226a to be coupled to the SR-SNS pin 228. A resistance value of external resistive element 244 is generally fixed by the manufacturer of the AC-DC converter 200 and is selected based on an expected maximum voltage on the drain node 226a based on the maximum AC voltage input, and turn-ratio of the transformer 204 to limit a maximum voltage on the SR_SEN node 228 to enable the secondary side controller 202 to be a made with non-high voltage devices, made using standard, low voltage technologies. Suitable values for the resistance of the resistive element 244 are from about 4KΩ to about 10KΩ. For example in one embodiment in which the maximum input voltage after bridge rectifier 210 is 380V and the transformer 204 has a 4:1 turn ratio, and the voltage of 21.5V DC on VBUS_IN, the SR_DRAIN 226a voltage can be 116.5V. Secondary side controller 202 is fabricated using a 20V tolerant technology, and the external resistive element 244 has a resistance of about 10KΩ and internal resistance of about 2KΩ to limit the maximum voltage on the drain node 226a to no more than about 21.5V.

The internal resistive element 246, shown schematically as a variable resistance in FIG. 2A, can have a resistance value set by the manufacturer at the time the AC-DC converter 200 is manufactured based on either desired input or output voltages, or to compensate for variations in parameters of the IC or other components in the AC-DC converter. Alternatively, the resistance value of the internal resistive element 246 can be dynamically adjusted by a calibration circuit in the AC-DC converter 200 or secondary side controller 202, either at start-up or powering on of the AC-DC converter, or periodically thereafter.

Optionally, as in the embodiment shown, the voltage divider 230 further includes a bypass switching element or switch 252 in parallel the internal rectifier 248. The switch 252 is closed during feed-forward (ff) sensing in response to an ff-signal (ff_enable) generated in the secondary side controller 202 upon detection of an increasing or non-zero positive voltage on the drain node 226a, which indicates a feed-forward operation. It is noted that although in the embodiment shown in FIG. 2A the internal rectifier 248 and the switch 252 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 2A, the AC-DC converter 200 further includes an isolation circuit or barrier 254 to electrically isolate the secondary side 208 from the high AC input voltage present on the primary side 206. Because the transformer 204 is a step down transformer it is generally considered part of the isolation barrier 254. Additionally where, as in the embodiment shown, the AC-DC converter 200 is a flyback converter in which a signal 256 is provided to the primary side controller 218 from pins on the secondary side controller 202, such as a feedback pin 243 or pulse width modulation (PWM) drive pin 258, the isolation barrier 254 can further include additional circuits or elements between the secondary side controller and the primary side controller 218 or PS 216. Details of these additional circuits or elements according to various embodiments are described below with reference to FIGS. 2C and 2D.

Figure 2B:
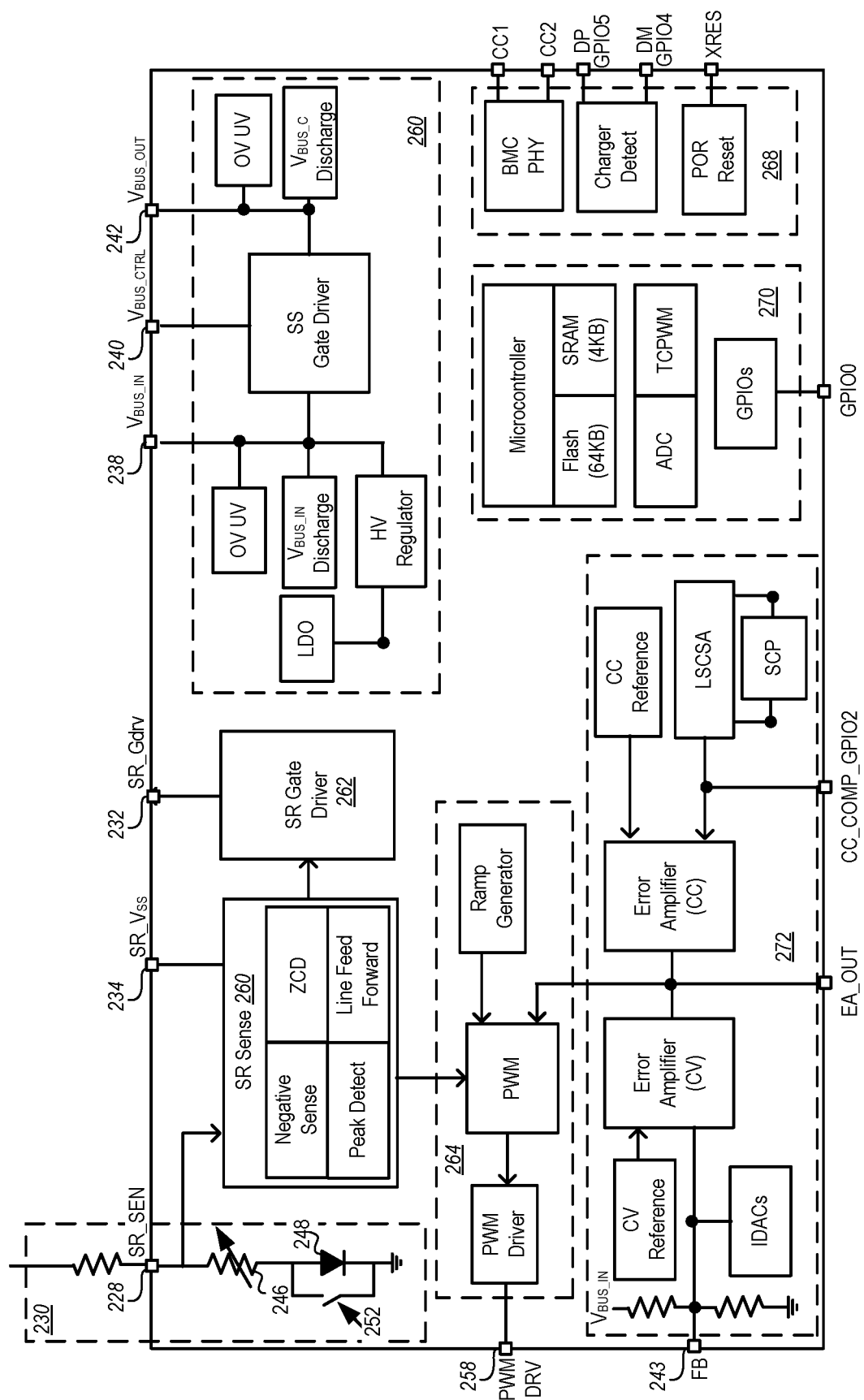
FIG. 2B is a detailed block diagram depicting an embodiment of the secondary-side controller of FIG. 2A in accordance with the present disclosure.

FIG. 2B is a detailed block diagram depicting an embodiment of the secondary-side controller 202 of FIG. 2A. Referring to FIG. 2B, in addition to the voltage divider 230 the secondary-side controller 202 generally further includes an SR sense circuit or block 260 and a SR gate driver circuit or block 262 coupled to the gate node 226b of the SR 226 through the SR-drive pin 232. The SR sense block 260 is coupled to the drain node 226a of the SR 226 through the single SR-SNS pin 228 and the voltage divider 230 and through the SR-Vss pin 234 to the source node 226c of the SR. The SR sense block 260 generally includes a zero-crossing detector (ZCD) block, a negative-sensing (NSN) block, a peak-detector (PKD) block, and a line-feed-forward (LFF) block for sensing a voltage on the drain 226a of the SR 226 to sense or detect a zero-crossing, a negative voltage, a peak (positive) voltage and a feed-forward operation. One or more outputs of the SR sense block 260 are coupled to the SR gate driver block 262 to control the SR 226 and to a pulse width modulation (PWM) circuit 264 to provide a signal 256 through the PWM drive pin 258 to the primary side controller 218 to control the PS 216. The PWM circuit 264 includes a ramp generator and PWM for generating a signal having a modulated pulse width, and a PWM driver for boosting a voltage or power of the signal to that necessary for driving the primary side controller 218 or PS 216.

As shown in FIG. 2B, the secondary side controller 202 further includes a secondary switch (SS) circuit 266. The SS circuit 266 includes OV-UV circuits or blocks for detection over voltage (OV) and under voltage (UV) conditions on $V_{BUS\_IN}$ 238 and $V_{BUS\_OUT}$ 242; low dropout (LDO) and high voltage (HV) regulators; and discharge circuits or blocks for discharging $V_{BUS\_IN}$ and $V_{BUS\_OUT}$.

An interface circuit 268 switch includes circuits or blocks for communicating with a device being powered or charged by the AC-DC converter 200 to support various charging protocols. These circuits or blocks can include a Biphase Mark Code (BMC) physical layer (PHY) to communicate with device using certain charging protocols, a charger detect block and a power on reset (POR) block to reset the device, putting it into a known state on initiation of charging by the AC-DC converter 200.

The secondary side controller 202 further includes a microcontroller unit (MCU) subsystem 270 including logic a microprocessor or controller for executing programs stored memory in the MCU subsystem; analog-to-digital converters (ADC); a multipurpose Timer Counter Pulse Width Modulator (TCPWM) capable of performing a multiple functions necessary for operation of the MCU; and a number of general purpose input/outputs (GPIOs), only one of which is shown.

Lastly, the secondary side controller 202 further includes a feedback circuit or circuit 272 coupled to the feedback pin 243 to provide error correction to the PWM circuit 264, and, in certain embodiments of the isolation barrier 254 to provide a feedback signal to the primary side controller 218. Generally, as in the embodiment shown circuit 272 includes a constant voltage (CV) reference, a constant current (CC) reference, one or more error amplifiers and inter-digital analog converters (IDACs), a low-side current sense amplifier (LSCSA), and a short circuit protection (SCP) block.

Embodiments of the isolation barrier 254 of the AC-DC converter 200 of FIG. 2A will now be described with reference to FIGS. 2C and 2D. It is noted that FIGS. 2C and 2D each illustrate one exemplary embodiments of the isolation barrier 254, and that other embodiments of the isolation barrier can be implemented that may or may not include all elements and components shown in these figures. Thus, the embodiments of FIGS. 2C and 2D are not intended to limit the present invention and the appended claims in any way.

Figure 2C:
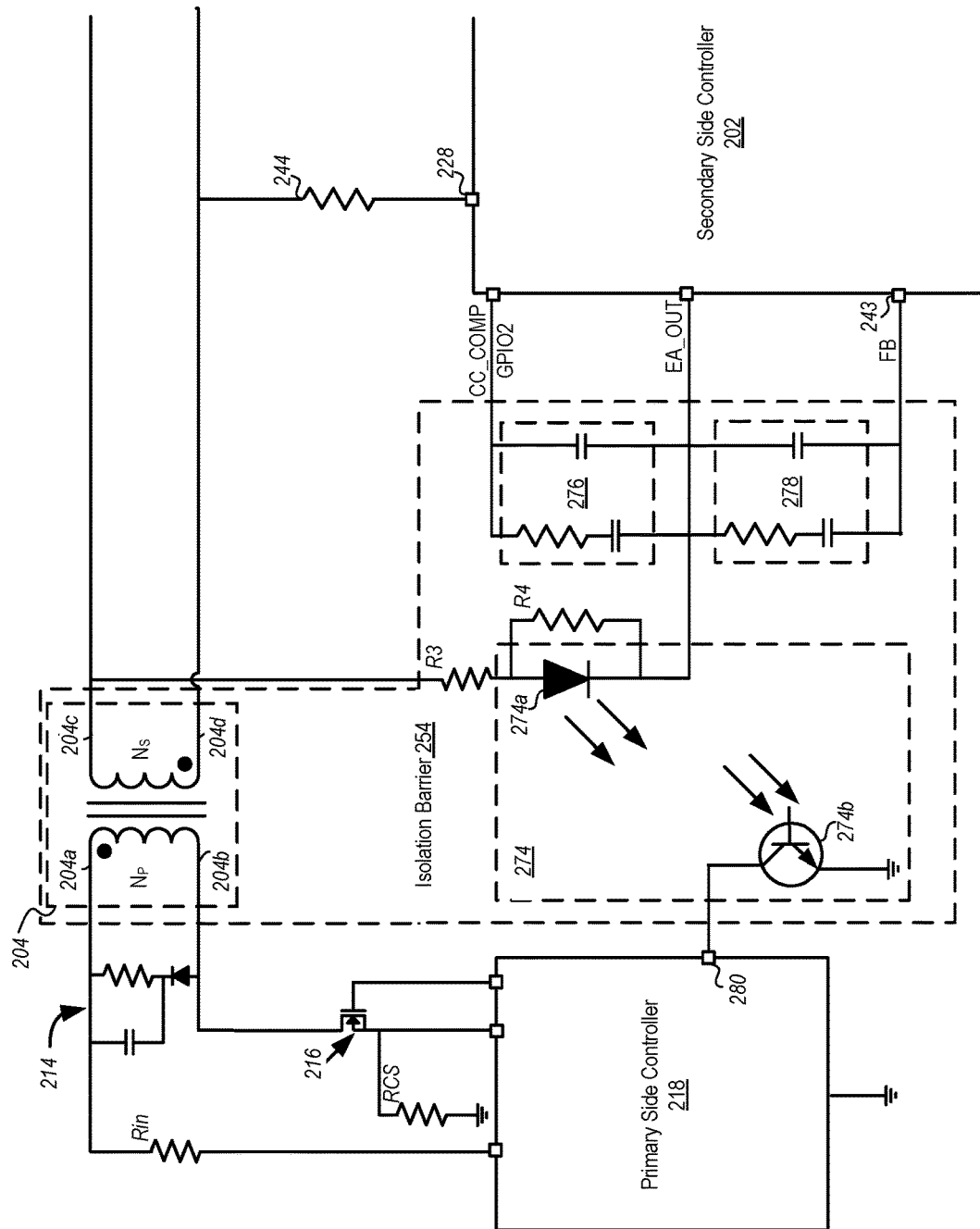
FIG. 2C is a schematic block diagram depicting an embodiment of the isolation barrier of FIG. 2A including an opto-isolator in accordance with the present disclosure.

Referring to FIG. 2C, in a first embodiment the isolation barrier 254 includes an opto-isolator 274 to provide electrical isolation between the feedback pin 243 of the secondary side controller 200 and the primary side controller 218. Generally, the opto-isolator includes a light emitting element, such as a light emitting diode (LED) 274a and a light sensitive element, such as a light sensitive or phototransistor 274b. The LED 274a has a cathode coupled directly to an error amplifier output pin (EA OUT), and an anode coupled to the third terminal 204c of the transformer 204 through a voltage divider including a first resistive element (R3) and a second resistive element (R4). The cathode of the LED 274a is further coupled to the FB pin 243 and to a constant current compensation general purpose input/output (CC_COMP_GPIO), through resistor-capacitor filters or networks 276 and 278. The phototransistor 274b can include a bipolar NPN transistor, and is coupled to the primary side controller 218 through an FB_input pin 280. In this embodiment, the secondary side controller 202 uses outputs from the error amplifier 272 to take the feedback from the secondary side and pass it on to the primary controller over the opto-isolator 274. This architecture provides three key features: secondary side sensing and regulation, synchronous rectification, and charging port controller.

Figure 2D:
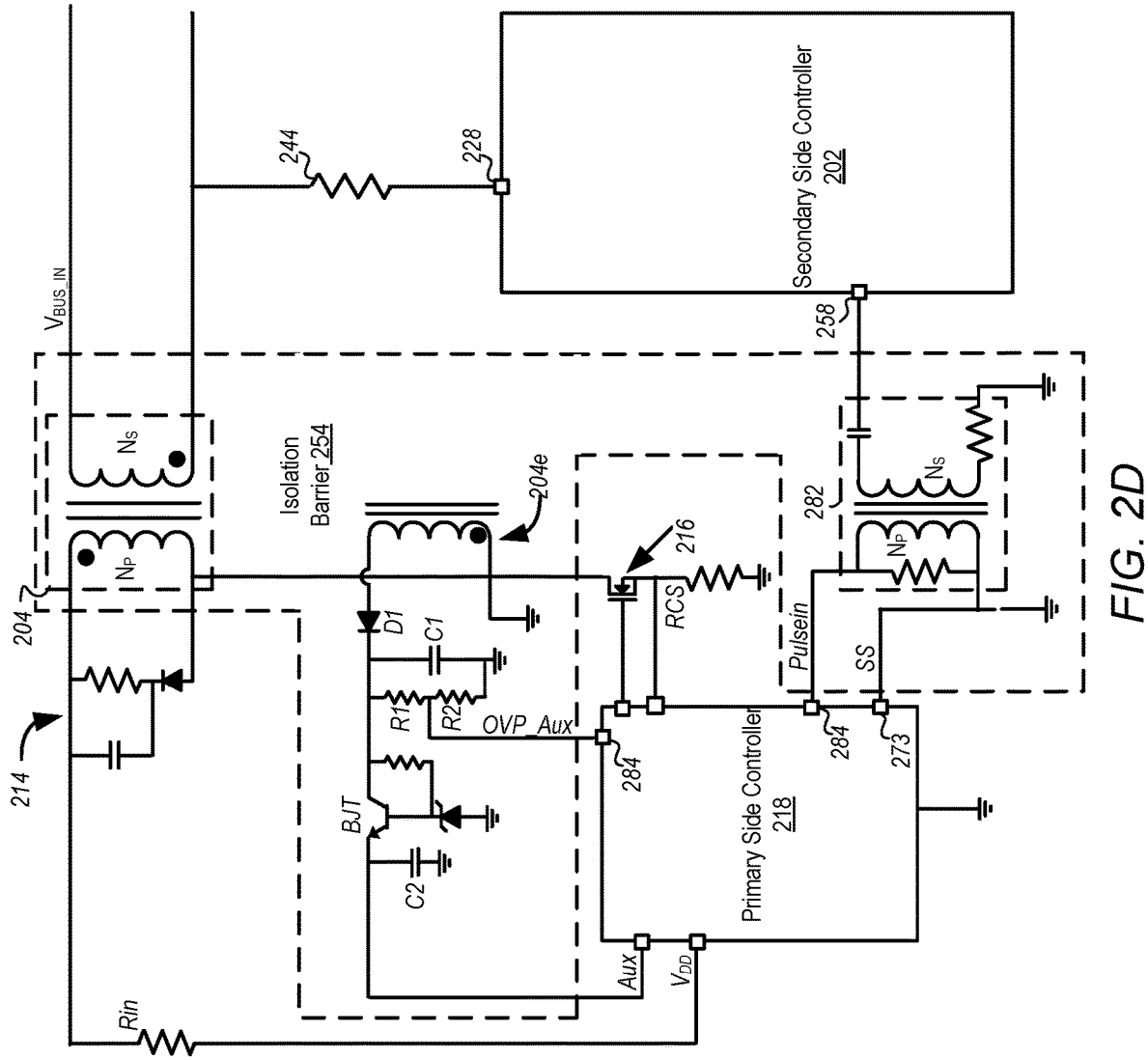
FIG. 2D is a schematic block diagram depicting another embodiment of the isolation barrier of FIG. 2A including a pulse transformer in accordance with the present disclosure.

FIG. 2D is a schematic block diagram depicting another embodiment of the isolation barrier of FIG. 2A including a pulse transformer 282 coupled between the PWM drive pin 258 of the secondary side controller 202 and a pulse_in pin 284 and a soft-start (SS) pin 273. The PWM drive pin 258 to the primary side controller 218 of the primary side controller 218 modulates the pulse width of the primary MOSFET in voltage mode control. In this architecture the primary side controller 218 engages the error amplifier 272 and the programmable ramp generator of the PWM circuit 264 to determine the pulse width of the PWM signal. This PWM signal is transferred from the secondary side controller 202 to the primary side controller 218 through the pulse transformer 282. This architecture, like that of FIG. 2C, also provides three key features: secondary side sensing and regulation, synchronous rectification, and charging port controller. The isolation barrier also includes an auxiliary coil of the transformer 204, which functions as a fly-back step-down transformer 204e to provide power to primary side controller 218 via an Aux pin. The step-down transformer 204e along with a diode D1 followed by capacitor C1 to ground stores the stepped-down-voltage which is then clipped by a bipolar junction transistor (BJT) structure and then coupled to the Aux pin. This additional circuit helps to reduce total power consumption of the AC-DC converter 200 as the primary side controller 218 is supplied through the Aux pin instead of by a separate power supply through another pin coupled to the first terminal 204a on the primary side 206 of the transformer 204 through Rin. A resistor divider R1, R2, connected to an over voltage protection (OVP)_AUX pin 284 of primary side controller 218 is used to sense a reflected voltage of VBUS_IN on the secondary side 208 via the step-down transformer 204e. With this VBUS_IN signal primary side controller 218 can disable PS 216, shown here as a PR_FET, using internal circuitry of the primary side controller.

Figure 2E:
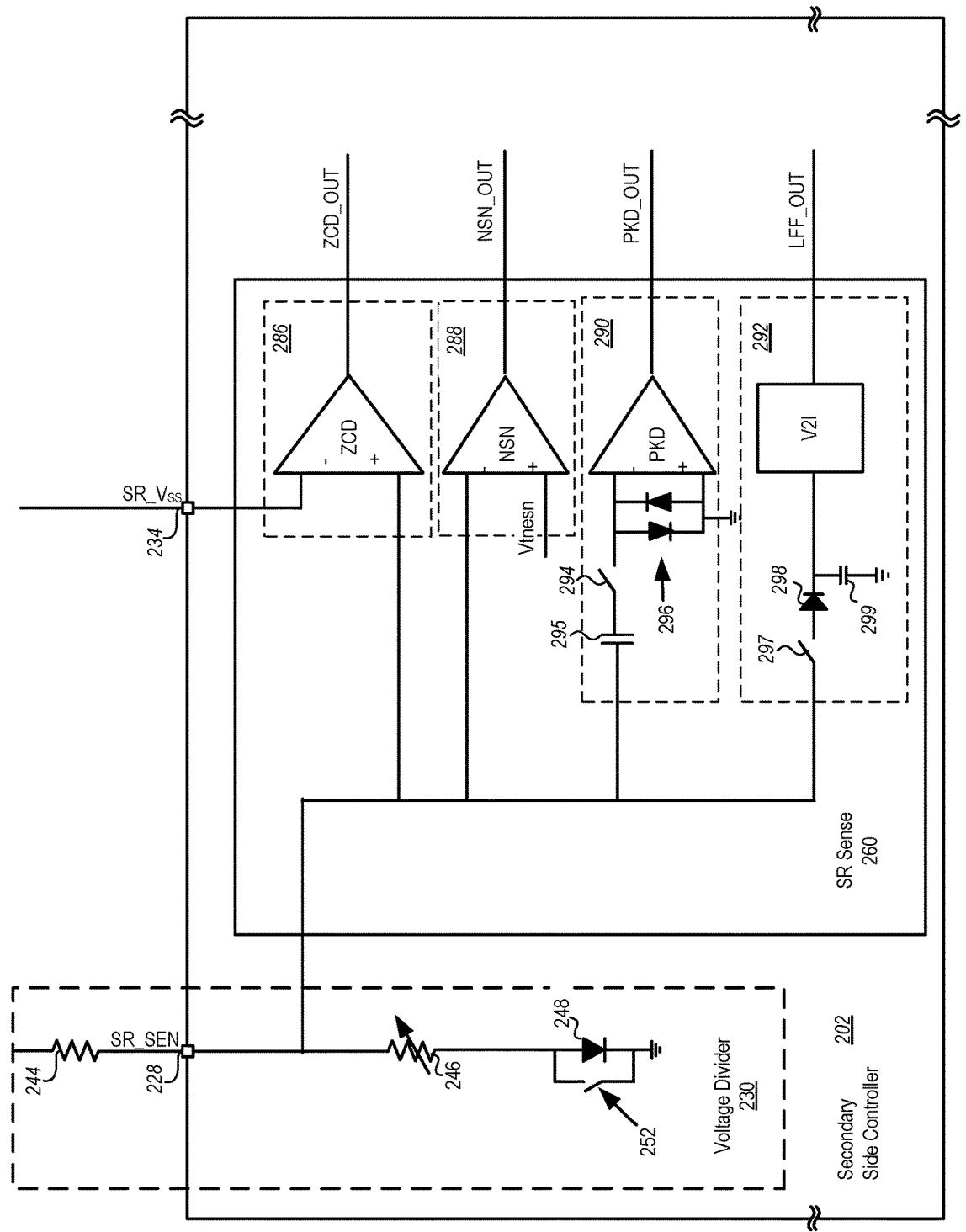
FIG. 2E is a schematic block diagram depicting of a portion of the secondary-side controller of FIG. 2B depicting an embodiment of the SR sense block in accordance with the present disclosure.

FIG. 2E is a schematic block diagram depicting of a portion of the secondary-side controller of FIG. 2B depicting an embodiment of the SR sense block 260 in accordance with the present disclosure. As shown in FIG. 2E, the SR sense block includes a zero-crossing detector (ZCD) block 286, a negative-sensing (NSN) block 288, a peak-detector (PKD) block 290, and Line-feed-forward (LFF) block 292, all integrally formed on a single IC with other components and elements of the secondary side controller 202.

The ZCD block 286 can include a comparator having a first, inverting input coupled through the SR-Vss pin 234 to the source node 226c of the SR 226, and a second, non-inverting input coupled to the SR-SNS pin 228 and through the voltage divider 230 to the drain node 226a of the SR. During the ZCD detection phase, where the SR_DRAIN 226a is at negative voltages and ramping towards 0V, the rectifier 248 is kept enabled without enabling switch 252 to allow no voltage division in voltage divider 230. This enables direct voltage of SR_DRAIN 226a at the non-inverting input 228 of the ZCD comparator 286. The comparator of the ZCD block 286 can be configured to generate a zero current signal (ZCD_OUT) to turn off the SR 226 when zero voltage is sensed on the SR-SNS pin 228 and SR_DRAIN pin 226a crossing without any voltage division. No voltage division enables precise detection of Zero-current (or voltage crossing of SR_DRAIN 226a which improves efficiency of the AC-DC converter 200.

The NSN block 288 can also include a comparator having a first, inverting input coupled to the SR-SNS pin 228 and through the voltage divider 230 to the drain node 226a of the SR 226, and a second, non-inverting input coupled to a negative reference voltage (Vtnesn) which can be anywhere from −700 mV to +200 mV. This reference voltage Vtnesn can be defined to desired negative voltage trip point at which the controller needs to turn-on the SR_GDRV 226b. An alternate method for negative reference voltage could be, for example, connecting non-inverting input coupled through the SR-Vss pin 234 to the source node 226c of the SR 226 and the comparator can have in-build offset to trip when SR-SNS pin 228 is at negative voltage. During the NSN detection phase, where the SR_DRAIN 226a is going from positive to negative voltages, the rectifier 248 is kept enabled without enabling switch 252 to allow no voltage division in voltage divider 230. This enables direct voltage of SR_DRAIN 226a at the inverting input 228 of the NSN comparator 288. The NSN comparator 288 generates a negative voltage signal (NSN_OUT) to turn-on the SR 226.

During power delivery on the secondary side, when the SR 226 turns-off, and as PS 216 has not yet turned-on, it results in LC sinusoidal oscillations on the SR_DRAIN 226a as well as inverted sinusoidal on the PR drain 204b terminal of the fly-back transformer 204. To improve AC-DC converter efficiency, primary switch 216 must be turned on when there is a Valley in these sinusoidal oscillations, which corresponds to Peak on the secondary SR_DRAIN 226a node. The PKD block 290 is the peak sensing block on the secondary side. The PKD block 290 can also include a comparator having a first, inverting input coupled to the SR-SNS pin 228 through a switch 294 and an internal capacitor 295, and from the SR-SNS pin to the drain node 226a of the SR 226 through the voltage divider 230, and a second, non-inverting input coupled to ground. Generally, as in the embodiment shown the PKD block 290 further includes a back to back connected diode circuit 296 across the first and second inputs to the comparator to detect the peak of the sinusoidal waveform seen on SR_SEN 228. The comparator is configured to generate a peak voltage detection signal (PKD_OUT), which can be coupled to the primary side controller 218 to turn on the PS 216 to enable a valley switching mode of operation. The switch 294 is kept off during NSN and ZCD detection phase to avoid capacitive load offered by PKD block, on SR_SEN 228 node, which reduces the delay in sensing NSN and ZCD and improves performance and efficiency of the AC-DC converter 200. The switch 294 is turned-on during Peak-detection function, by using a derived signal of ZCD_OUT as ZCD_OUT decides turning-off of SR_FET 226, after which LC sinusoidal oscillation starts.

Finally, AC Line-Feed-Forward (LFF) block 292 can include a voltage-to-current (V2I) block, which is coupled through a switch 297, a sample and hold arrangement using diode element 298 along with charge-storage element (capacitor 299) to the SR-SNS pin 228 and through the voltage divider 230 to the drain node 226a of the SR 226. During the phase when primary switch 216 is turned on, the difference between node 204d and 204c of fly-back transformer develops a proportional reflected voltage of line-in rectified voltage on node 204a of transformer 204, in accordance to turn-ratio (N) of fly-back transformer 204. As node 204d is also coupled to SR_DRAIN 226a which is used as a sensing node insider secondary-side-controller 202 after a resistor divider 230, the node SR_SEN 228 also carries the line-in voltage information which is derived using LFF block 292. The line-in information can be used by secondary-side-controller 202 to alter the valley switching or PWM pulse-width to optimize the efficiency of the AC-DC converter 200 across variable AC line-in. The phase where primary switch 216 is turned-on and SR_DRAIN 226a gets reflected proportional voltage, is defined as feed-forward sensing phase and during this phase, switch 297 is turned-on to start sensing line-In voltage via SR_SEN 228 pin. At the same time, switch 252 is also turned on to bypass rectifier element 248 to allow exact resistive divided version of SR_DRAIN 226a to reach at the input of LFF block 292. The switch 297 is kept off during NSN and ZCD detection phases to avoid capacitive load offered by LFF block on SR_SEN 228 node, which helps to reduce the delay in sensing NSN and ZCD and improves performance and efficiency of the AC-DC converter 200. LFF block 292 is configured to generate a current signal (IFF_OUT) when the AC-DC converter 200 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary side controller, like for altering Valley at which primary FET 216 to be turned-on based on line AC voltage for same output power requirement, to improve performance of the AC-DC converter 200.

Figure 4:
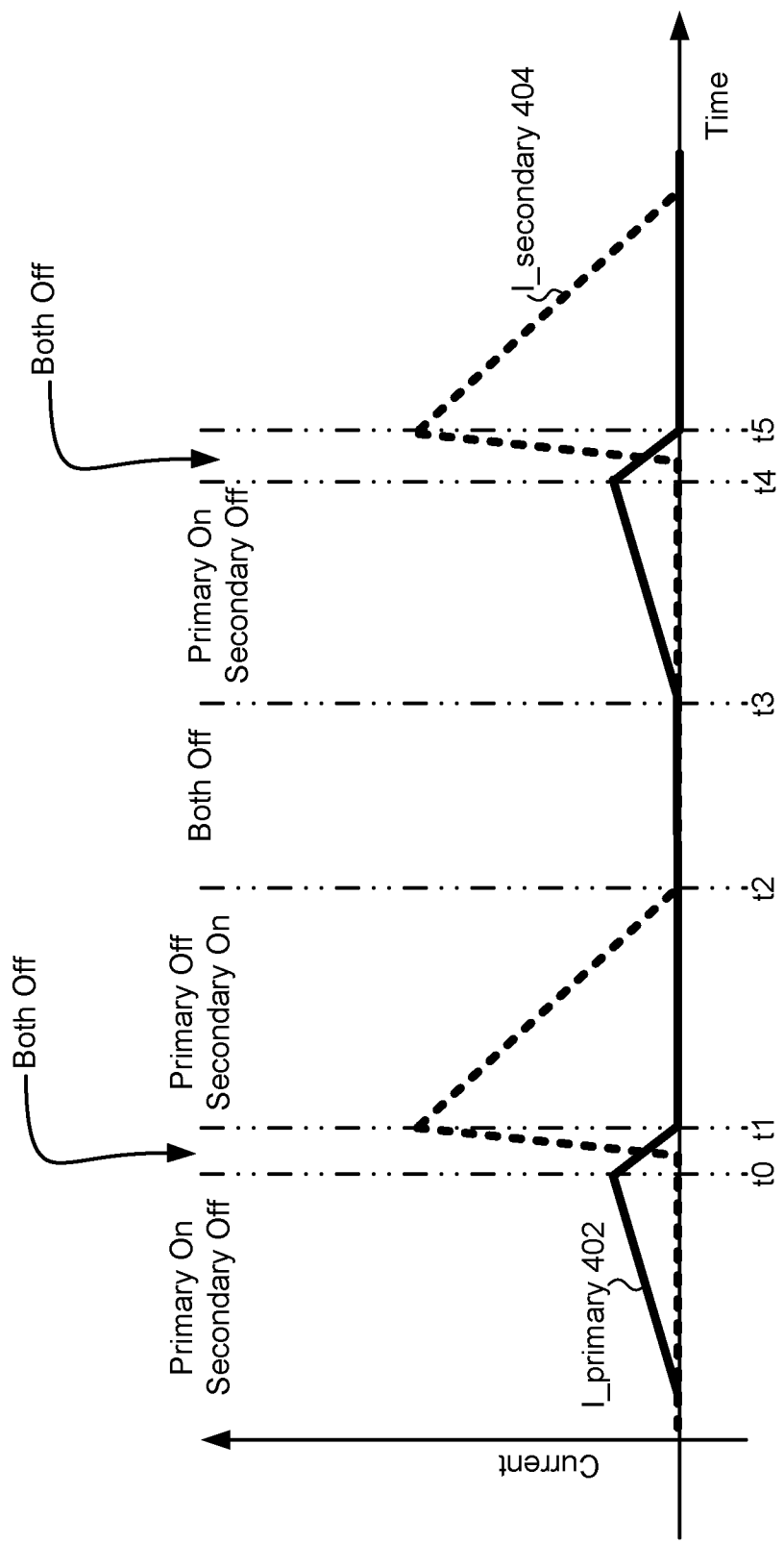
FIG. 4 is a graph showing primary current (I_primary) and secondary current (I_secondary) over time in the circuit of FIG. 2A as operated by the method of FIG. 3.
Figure 5:
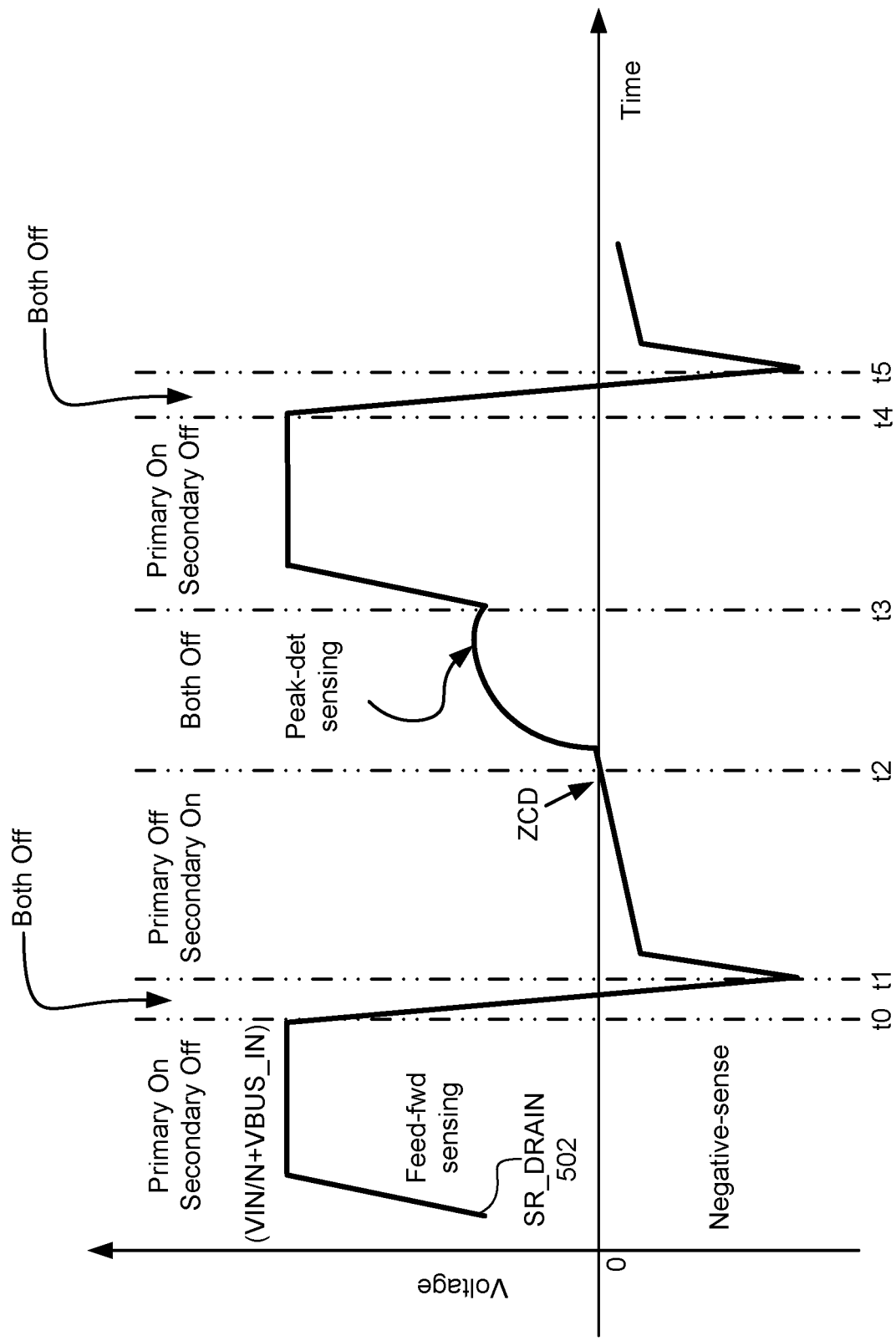
FIG. 5 is a graph showing voltage on a drain node of a SR over time in the in the circuit of FIG. 2A when operated by the method of FIG. 3.

A method of operating an AC-DC converter having a secondary side controller including an IC having a single SR-SNS pin through which the IC is coupled to the drain of a SR through a voltage divider will now be described with reference to the flowchart of FIG. 3, and the graphs of FIGS. 4 and 5. FIG. 4 is a graph showing primary current (I_primary 402) and secondary current (I_secondary 404) in the circuit of FIGS. 2A-E when operated by the method of FIG. 3. FIG. 5 is a graph showing the resulting voltage 502 on the drain node of the SR when operated by the method of FIG. 3.

Figure 3:
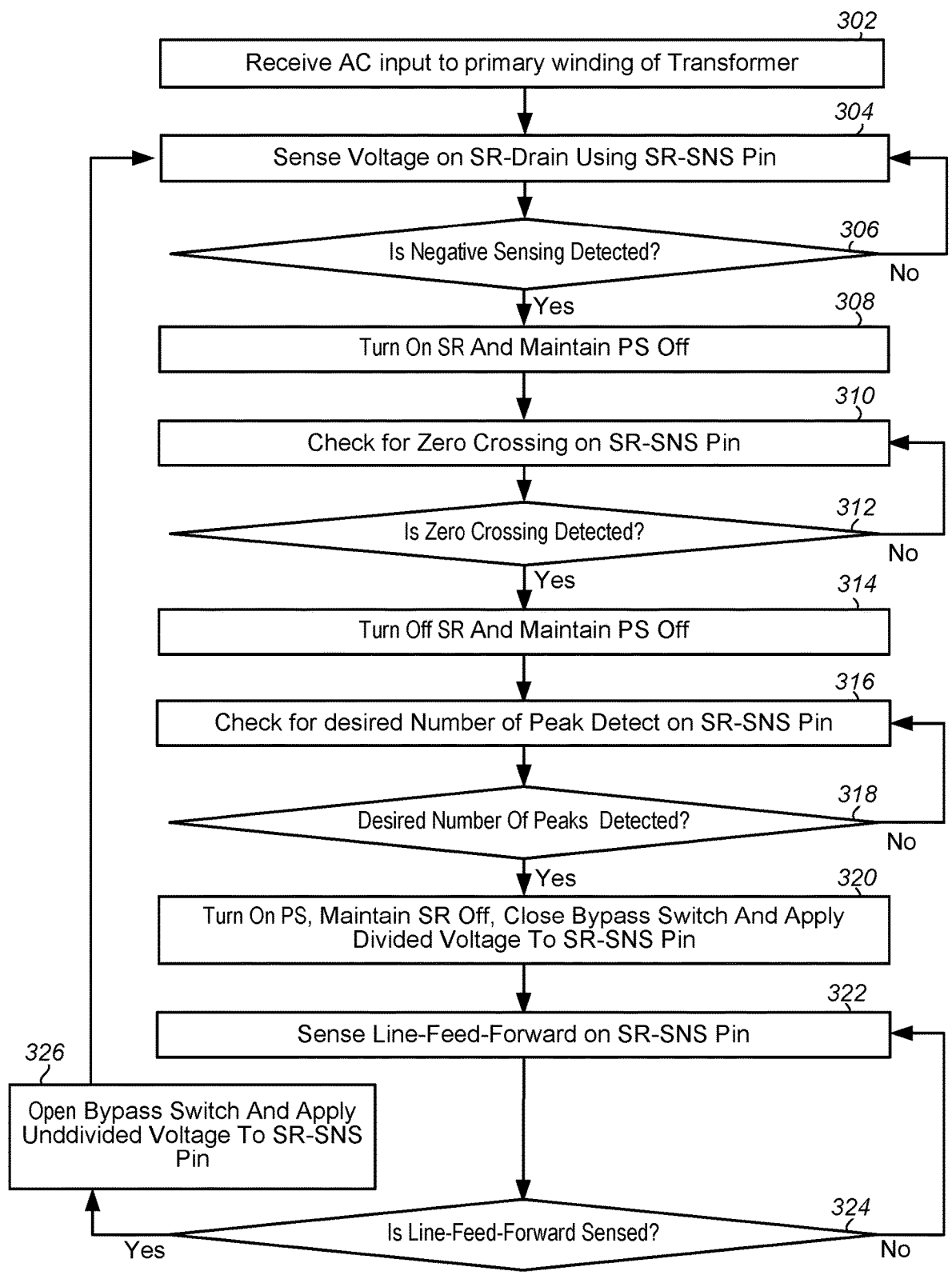
FIG. 3 is a flowchart illustrating an embodiment of a method for operating an AC-DC converter including a secondary-side controller and SR architecture in accordance with the present disclosure.

Referring to FIG. 3 and to FIGS. 2A and 2E the method begins with receiving a rectified AC input to the primary side 206 of the transformer 204 (302). A voltage on the drain 226a of the SR 226 is sensed through the single SR-SNS pin 228 (304). Next, it is determined if negative sensing is detected (306). Generally, determining if the AC-DC converter is operating in a negative sensing mode is accomplished by sensing an increasing negative voltage on the SR-SNS pin 228. If negative sensing is not detected step or block 304 is repeated and the voltage on the drain 226a of the SR 226 continues to be sensed through the single SR-SNS pin 228. If negative sensing is detected, the SR 226 is turned on while the power switch or PS 216 on the primary side is 206 of the transformer 204 is maintained off (308).

Next, a check is performed for a zero crossing on SR-SNS pin 228 using the ZCD block 286 in the secondary side controller 202 (310), and it is determined if a zero-crossing is detected (312). If a zero crossing is not detected step or block 310 is repeated to continue to check for a zero crossing on the SR-SNS pin 228. If a zero crossing is detected, the SR 226 is turned off and the PS 216 is maintained off (314).

A check is then performed for a predetermined or desired number of peaks of a predetermined or desired peak voltage detected on SR-SNS pin 228 using the PKD block 290 in the secondary side controller 202 (316), and it is determined if the desired number of peaks is detected (318). If the desired number of peaks is not detected step or block 316 is repeated to continue to check for the desired number of peaks. If the desired number of peaks is detected, the SR 226 is maintained off, the PS 216 is turned on (320), and the bypass switch 252 closed to apply a divided voltage to the SR-SNS pin 228.

Next, a check is performed to sense if the AC-DC converter 200 is operating in a Line-Feed-Forward (LFF) sensing mode (322), and a determination made whether or not LFF is sensed (324). Generally, determining if the AC-DC converter 200 is operating in a LFF sensing mode is accomplished by sensing a rising or steady positive voltage on drain 226a of the SR 226 applied through the single SR-SNS pin 228 using the LFF block 292. If the AC-DC converter 200 is not operating in a LFF sensing mode, step or block 322 is repeated to continue to check for LFF sensing. If it is determined the AD-DC converter is operating in a LFF sensing mode, bypass switch 252 is opened so that the voltage applied to the secondary side controller 202 through the single SR-SNS pin 228 is undivided by the voltage divider 230 (326), and step or block 304 is repeated to sense voltage on the drain 226a of the SR 226 through the single SR-SNS pin 228.

Figure 6A:
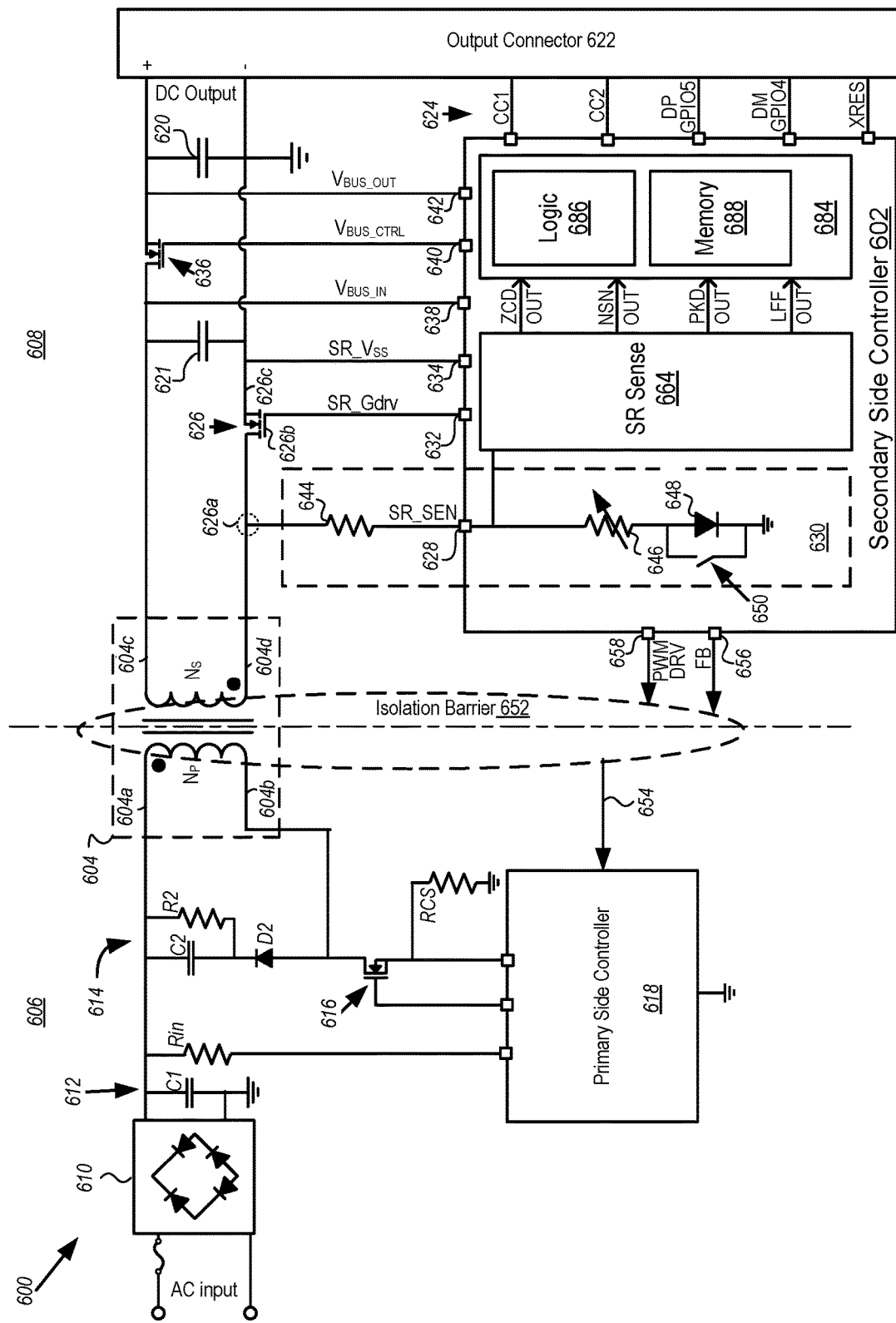
FIG. 6A is a schematic block diagram depicting an embodiment of an AC-DC converter including a secondary-side controller and synchronous flyback architecture to generate primary switch (PS) signals to improve efficiency in accordance with the present disclosure.
Figure 6B:
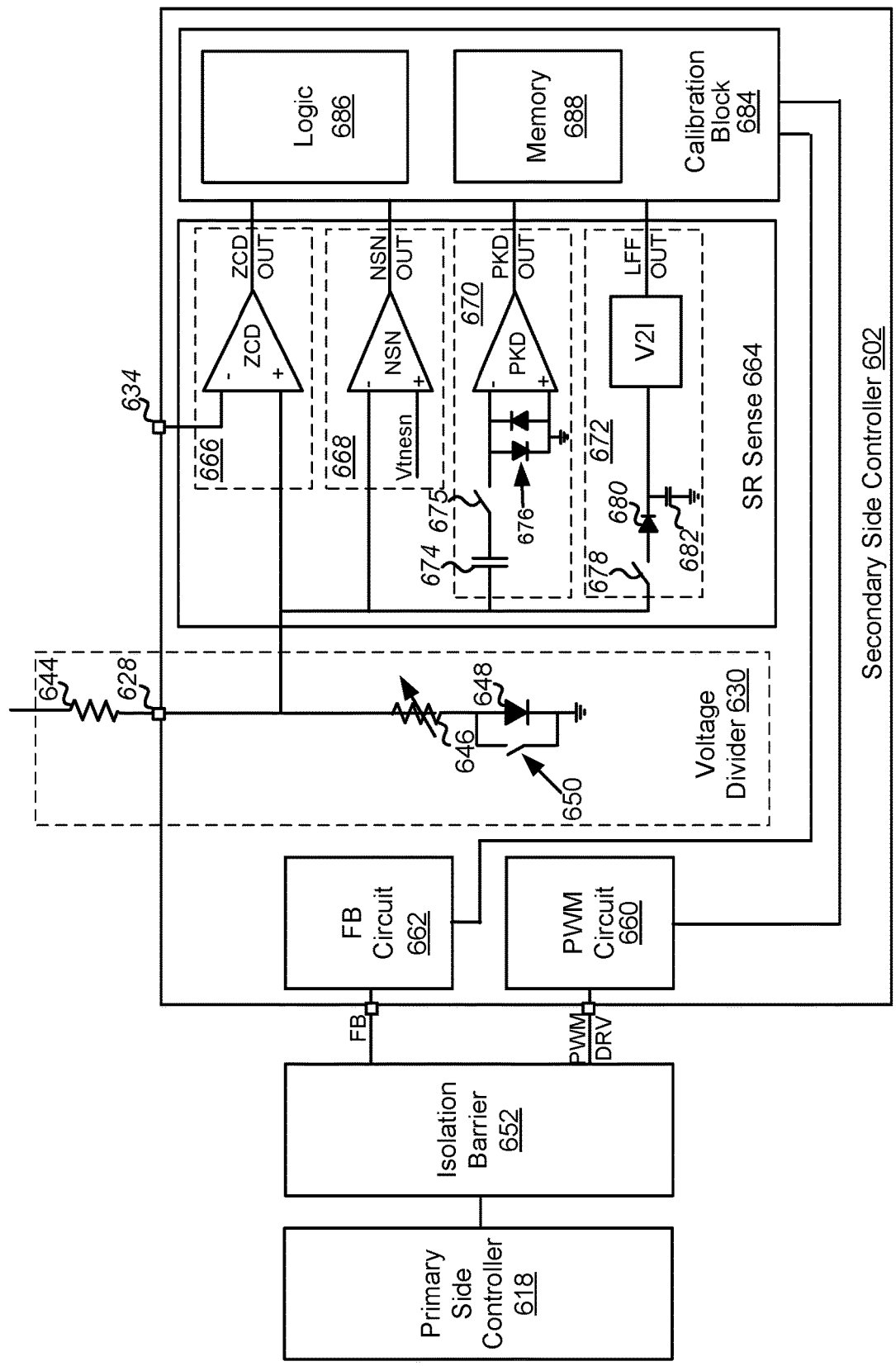
FIG. 6B is a schematic block diagram depicting of a portion of the secondary-side controller of FIG. 6A including an embodiment of the calibration block in accordance with the present disclosure.

In another aspect the present disclosure is directed to a flyback converter including a secondary-side controller configured to generate primary FET or PS signals to improve an accuracy of valley detection and thus an efficiency of the converter, and method of operating the same. An embodiment of a flyback converter including a secondary-side controller with a SR architecture, and configured to generate primary FET or PS signals to improve an accuracy of valley detection will now be described with reference to FIGS. 6A and 6B. FIG. 6A is a schematic block diagram depicting an embodiment of an AC-DC converter including a secondary-side controller and synchronous flyback architecture. FIG. 6B is a schematic block diagram depicting of a portion of the secondary-side controller of FIG. 6A including an embodiment of a calibration block in accordance with the present disclosure.

Referring to FIG. 6A, the flyback converter 600 generally includes a transformer 604 having a primary winding (NP) on a primary side 606 electrically connected or coupled to an AC input, and a secondary winding (NS) on a secondary side 608 coupled to a DC output.

On the primary side 606 a rectifying circuit, such as a bridge rectifier 610, and one or more input filters 612, 614, coupled to a first terminal 604a of the transformer 604 rectify an AC input voltage and supply input power to the primary winding of the transformer 604. The input filters can include a first input filter 612 having a capacitor (C1) coupled to or across an output of the rectifier 610, and a second, RC filter 614 including a resistor or resistive element (R2) and a capacitor (C2) coupled in parallel between the first terminal 604a of the transformer 604 and a cathode of a diode or rectifier (D2) having an anode coupled to a second terminal 604b of the transformer. Generally, as in the embodiment shown, the flyback converter 600 further includes a power switch (PS 616), such as a primary field effect transistor (PR_FET), having a first or drain node coupled to the second terminal 604b of the transformer 604, a second or gate node coupled to a primary side controller 618, and a third or source node coupled to the primary side controller and, through a current sensing element, such as a resistive element (RCS) to ground to sense a primary side current (I_primary) flowing through the primary winding when the PS 616 is closed or conducting. Generally, as in the embodiment shown, the primary side controller 618 is further coupled to the first terminal 604a of the transformer 604 through a resistive element (Rin) to receive a voltage or signal equal or proportional to the rectified AC input voltage.

On the secondary side 608 the flyback converter 600 includes a filter capacitor 621 coupled between a third terminal 604c of the transformer 604 and an electrical ground or ground terminal, and an output capacitor 620 coupled between a third terminal 604c of the transformer 604 through an additional or secondary switch (SS) 636, such as a provider MOSFET, and an electrical ground or ground terminal to provide a DC output voltage to an output interface or connector 622. Generally, as in the embodiment shown, the output connector 622 is further coupled to the secondary side controller 602 through a number of communication channels 624 to support various charging protocols. Suitable output connectors 622 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the flyback converter 600 is compliant with the USB protocol to provide a DC output voltage of about 3.3 VDC to about 11 VDC at a current of from about 300 to about 3000 milliamps (mA).

In accordance with the present disclosure, the flyback converter 600 further includes on the secondary side 608 a synchronous rectifier (SR 626), such as a synchronous rectifier field effect transistor (SR_FET), coupled between a fourth terminal 604d of the transformer 604 and the ground terminal of the DC output. The SR 626 includes a first or drain node 626a coupled to the fourth terminal 604d of the transformer 604 and the secondary side controller 602 to sense a voltage on the drain of the SR; a second or gate node 626b coupled to the secondary side controller to drive or control the SR; and a third or source node 626c coupled to the secondary side controller and the ground terminal of the DC output.

In certain embodiments, such as that shown, the secondary side controller 602 is realized or implemented as single integrated circuit (IC), or as a number of ICs packaged in a single IC package, and the drain node 626a is coupled to a single SR-SNS pin 628 of the IC through a voltage divider 630 including circuit elements both internal and external to the IC of the secondary side controller. The gate node 626b of the SR 626 is coupled to the secondary side controller 602 through a SR-drive pin 632, and the source node 626c of the SR is coupled to the secondary side controller through a SR-Vss (negative voltage supply) pin 634.

Optionally, as in the embodiment shown, the secondary side further includes an additional or secondary switch (SS) 636, such as a NFET, coupled between the third terminal 604c of the transformer 604 and a positive DC output to enable to the secondary side controller 602 to turn off the DC output to protect against over voltage and/or under voltage conditions and/or over current conditions and/or short circuit conditions. The SS 636 includes a source node coupled to a voltage bus in pin ($V_{BUS\_IN}$) 638 of the secondary side controller 602; a gate node coupled to a voltage bus control pin ($V_{BUS\_CTRL}$) 640 to drive or control the SS; and a drain node coupled to a voltage bus out pin ($V_{BUS\_OUT}$) 642 and to the positive terminal of the DC output.

The voltage divider 630 includes an external resistive element 644, an internal resistive element 646 and an internal rectifier 648. Although shown schematically as a diode, it will be understood that this need not be case in every embodiment, and that internal rectifier 648 may be a PN diode (as shown), or alternatively, a synchronous diode or a FET configured or connected to function as a diode. The configuration or placement of the internal rectifier 648, i.e., connected with a cathode to ground, ensures that during negative sensing or zero-crossing operations there is substantially no current flow through the voltage divider 630, thereby allowing the full, undivided negative voltage on the drain node 626a to be coupled to the SR-SNS pin 628. A resistance value of external resistive element 644 is generally fixed by the manufacturer of the flyback converter 600 and is selected based on an expected maximum AC voltage input, a turn-ratio of the transformer 604 to limit a maximum voltage on the drain node 626a to limit a maximum voltage on the SR_SEN node 628 to enable the secondary side controller 602 to be a made with non-high voltage device, made using standard, low voltage technologies. Suitable values for the resistance of the resistive element 644 are from about 4KΩ to about 10KΩ. For example in one embodiment in which the maximum input voltage after bridge rectifier 610 is 380V and the transformer 604 has a 4:1 turn ratio, and the voltage of 21.5V DC on VBUS_IN, the SR_DRAIN 626a voltage can be 116.5V. Secondary side controller 602 is fabricated using a 20V tolerant technology, and the external resistive element 644 has a resistance of about 10KΩ to limit the maximum voltage on the drain node 626a to no more than about 21.5V.

The internal resistive element 646, shown schematically as a variable resistance in FIG. 6A, can have a resistance value set by the manufacturer at the time the flyback converter 600 is manufactured based on either desired input or output voltages, or to compensate for variations in parameters of the IC or other components in the flyback converter. Alternatively, the resistance value of the internal resistive element 646 can be dynamically adjusted by a calibration circuit in the flyback converter 600 or secondary side controller 602, either at start-up or powering on of the flyback converter, or periodically thereafter.

Optionally, as in the embodiment shown, the voltage divider 630 further includes a switching element or switch 650 in parallel the internal rectifier 648. The switch 650 is closed during feedforward (ff) sensing in response to an ff-signal (ff_enable) generated in the secondary side controller 602 upon detection of an increasing or non-zero positive voltage on the drain node 626a, which indicates a feedforward operation. It is noted that although in the embodiment shown in FIG. 6A the internal rectifier 648 and the switch 650 are shown schematically as two separate and distinct elements, this need not be the case in every embodiment, and the rectifier and switch may alternatively include a single device, such as a FET, in which the switch is formed by the FET and the rectifier is formed by an intrinsic body diode between a source and drain of the FET.

As shown in FIG. 6A, the flyback converter 600 further includes an isolation circuit or barrier 652 to electrically isolate the secondary side 608 from the high AC input voltage present on the primary side 606. Because the transformer 604 is a step down transformer it is generally considered part of the isolation barrier 652. Additionally where, as in the embodiment shown, the AC-DC converter 600 is a flyback converter in which a signal 654 is provided to the primary side controller 618 from pins on the secondary side controller 602, such as a feedback pin 656 or pulse width modulation (PWM) drive pin 658, the isolation barrier 652 can further include additional circuits or elements between the secondary side controller and the primary side controller 618 or PS 616. The isolation barrier 652 can include an opto-isolator 274 or a pulse transformer 282 as described above with reference to FIG. 2D. As noted above, FIGS. 2C and 2D each set forth one exemplary embodiments of the isolation barrier 254, and that other embodiments of the isolation barrier can be implemented that may or may not include all elements and components shown in these figures.

Referring to FIG. 6B, as in secondary side controller 202 and SR sense block 260 shown in FIGS. 2B and 2E, the secondary side controller 602 further includes in addition to the voltage divider 630, a PWM circuit 660 and a feedback (FB) circuit 662 from which a PWM_DRV signal and a feedback (FB) signal are provided respectively and coupled through the isolation barrier 652 to the primary side controller 618, all integrally formed on a single IC with other components and elements of the secondary side controller. The SR sense block 664 includes a ZCD block 666, a NSN block 668, a PKD block 670, and a line feedforward (LFF) block 672. The ZCD block 666 can include a comparator having a first, inverting input coupled through the SR-Vss pin 634 to the source node 626c of the SR 626, and a second, non-inverting input coupled to the SR-SNS pin 628 and through the voltage divider 630 to the drain node 626a of the SR. During the ZCD detection phase, where the SR_DRAIN 626a is at negative voltages and ramping towards 0V, the rectifier 648 is kept enabled without enabling switch 650 to allow no voltage division in voltage divider 630. This enables direct voltage of SR_DRAIN 626a at the non-inverting input of the ZCD comparator. The comparator of the ZCD block 666 can be configured to generate a zero current signal (ZCD_OUT) to turn off the SR 626 when zero voltage is sensed on the SR-SNS pin 628 and SR_DRAIN pin 626a crossing without any voltage division. No voltage division enables precise detection of zero-current or voltage crossing of SR_DRAIN 626a which improves efficiency of the flyback converter 600.

The NSN block 668 can also include a comparator having a first, inverting input coupled to the SR-SNS pin 628 and through the voltage divider 630 to the drain node 626a of the SR 626, and a second, non-inverting input coupled to a negative reference voltage (Vtnesn) which can be anywhere from −700 mV to +200 mV. This reference voltage Vtnesn can be defined to desired negative voltage trip point at which the controller needs to turn-on the SR_GDRV 626b. An alternate method for negative reference voltage could be, for example, connecting non-inverting input coupled through the SR-Vss pin 634 to the source node 626c of the SR 626 and the comparator can have in-build offset to trip when SR-SNS pin 628 is at negative voltage. During the NSN detection phase, where the SR_DRAIN 626a is going from positive to negative voltages, the rectifier 648 is kept enabled without enabling switch 650 to allow no voltage division in voltage divider 630. This enables direct voltage of SR_DRAIN 626a at the inverting input 628 of the NSN comparator. The NSN comparator generates a negative voltage signal (NSN_OUT) to turn-on the SR 626.

During power delivery on the secondary side, when the SR 626 turns-off, and as PS 616 has not yet turned-on, it results in LC sinusoidal oscillations on the SR_DRAIN 626a as well as inverted sinusoidal on the primary drain 604b terminal of the fly-back transformer 604. To improve AC-DC converter efficiency, primary switch 616 must be turned on when there is a Valley in these sinusoidal oscillations, which corresponds to a peak on the secondary SR_DRAIN 626a node. The PKD block 670 is the peak sensing block on the secondary side. The PKD block 670 can also include a comparator having a first, inverting input coupled to the SR-SNS pin 628 through a switch 67 and an internal capacitor 674, and through the voltage divider 630, and a second, non-inverting input coupled to ground. Generally, as in the embodiment shown the PKD block 670 further includes a back to back connected diode circuit 676 across the first and second inputs to the comparator to detect the peak of the sinusoidal waveform seen on SR_SEN 628. The comparator is configured to generate a peak voltage detection signal (PKD_OUT), which can be coupled to the primary side controller 618 to turn on the PS 616 to enable a valley switching mode of operation. The switch 675 is kept off during NSN and ZCD detection phase to avoid a capacitive load offered by the PKD block on SR_SEN 628 node, thus reducing any delay in sensing a negative sense mode (NSN) of operation and/or zero crossing detection (ZCD), thereby improving performance and efficiency of the flyback converter 600. The switch 675 is turned-on during peak-detection function, by using a derived signal form ZCD_OUT, as ZCD_OUT determines turning-off of SR_FET 626, after which LC sinusoidal oscillation can occur.

Finally, AC Line-Feed-Forward (LFF) block 672 can include a voltage-to-current (V2I) block, which is coupled through a switch 678, a sample and hold arrangement using diode element 680 along with charge-storage element (capacitor 682) to the SR-SNS pin 628 and through the voltage divider 630 to the drain node 626a of the SR 626. During the phase when primary switch 616 is turned on, the difference between node 604d and 604c of fly-back transformer develops a proportional reflected voltage of line-in rectified voltage on node 604a of transformer 604, in accordance to turn-ratio (N) of fly-back transformer 604. As node 604d is also coupled to SR_DRAIN 626a which is used as a sensing node insider secondary-side-controller 602 after a resistor divider 630, the node SR_SEN 628 also carries the line-in voltage information which is derived using LFF block 672. The line-in information can be used by secondary-side-controller 602 to alter the valley switching or PWM pulse-width to optimize the efficiency of the flyback converter 600 across variable AC line-in. The phase where primary switch 616 is turned-on and SR_DRAIN 626a gets reflected proportional voltage, is defined as feed-forward sensing phase and during this phase, switch 678 is turned-on to start sensing line-In voltage via SR_SEN 628 pin. At the same time, switch 650 is also turned on to bypass rectifier element 648 to allow exact resistive divided version of SR_DRAIN 626a to reach at the input of LFF block 672. The switch 678 is kept off during NSN and ZCD detection phases to avoid capacitive load offered by LFF block on SR_SEN 628 node, which helps to reduce the delay in sensing NSN and ZCD and improves performance and efficiency of the flyback converter 600. LFF block 672 is configured to generate a current signal (IFF_OUT) when the flyback converter 600 is operating in a feed-forward sensing mode. This IFF_OUT current then can be used to modulate PWM pulse-width as per line AC voltage, which improves performance and efficiency of the AC-DC converter over wide-range of AC input voltage range. The IFF_OUT current can also be converted to voltage which would be proportional to line AC input voltage and can be used for any function required on the secondary side controller, like for altering Valley at which PS 616 to be turned-on based on line AC voltage for the same output power requirement, to improve performance of the flyback converter 600.

In accordance with the present disclosure, the secondary side controller 602 further includes a calibration block 684 including logic circuits 686 and instructions stored in memory 688, the calibration block configured to perform a calibration to measure a loop turn-around delay (Tloop) and set timing for a signal to turn on the PS 616 in response to the voltage sensed on the drain 626a of the SR 626. Since a valley on the primary side occurs following turning on the PS 616 and causes the voltage sensed on the drain 626a of the SR 626 to go up, Tloop can be measured in the calibration block 684 by measuring a delay from a time when a signal is sent to turn-on the PS until a time when the voltage sensed on the drain 626a of the SR 626 goes up as indicated by detection of a zero-crossing by the ZCD block 666 in CCM mode. Tloop is shown, for example, between time t5 and t6 in FIGS. 8, 9 and 10. Post calibration, instructions such as firmware stored in the memory 688 can be executed to calculate a precise timing for subsequent signals to turn on the PS 616 with reference to a zero-crossing by the ZCD block 666, thereby ensuring the PS is turned on at or near a valley on the primary side and improving efficiency of the flyback converter 600.

Generally, the calibration block 684 accurately determines or detects valleys on primary with reference to a zero crossing. The timing for a first valley (1' Valley) following calibration is as shown in the formula below:

$$1^{st}\ \text{Valley} = Tzpk - Tloop$$

where Tzpk is the time from when a zero crossing is first sensed following calibration to a time when a first peak voltage is sensed on the drain 626a of the SR 626 following the calibration cycle. Tzpk is shown, for example, between time t2 and t3 in FIG. 10.

The timing for a subsequent valley ($N^{th}$ Valley) following the first valley is as shown in the formula below:

$$N^{th}\ \text{Valley} = Tzpk - Tloop + (N-1)Tpkpk$$

where N is an integer of 2 or more, and Tpkpk is the time between when two successive peak voltages are sensed on the drain 626a of the SR 626. An example of Tpkpk is shown, for example, between time t3 and t4 in FIG. 10.

It will be understood from the above that calibration cycle further includes determining the values of Tzpk and Tpkpk. In one embodiment, the calibration block 684 can measure Tzpk directly by measuring a time from when a zero crossing is sensed on the drain 626a of the SR 626 using the ZCD block 666 until a time when a peak voltage is first sensed by the PKD block 670. Similarly, the calibration block 684 can measure Tpkpk directly by measuring a time between when two successive peak voltages are sensed on the drain 626a of the SR 626 as sensed by the PKD block 670. Additionally, it is noted that in some embodiments the calibration cycle can include repeating the measuring of Tpkpk multiple iterations to obtain an average value of the time ($Tpkpk_{avg}$) between two successive peak voltages, thereby further improving the accuracy of valley detection in the primary side 606 and the efficiency with which the flyback converter is operated.

In an alternative embodiment, because the inductor-capacitor (LC) or valley ringing on the primary side following powering on the flyback converter depends on external components having fixed values, i.e., an inductance of the primary side (Lprim) and capacitance of a drain node of a primary FET or PS, the time between the first zero-crossing and the first peak voltage (Tzpk), and the time between two successive peak voltages (Tpkpk) can be calculated or measured for a particular application or flyback converter 600 and stored as a input to memory 688 instead of being measured.

Figure 8:
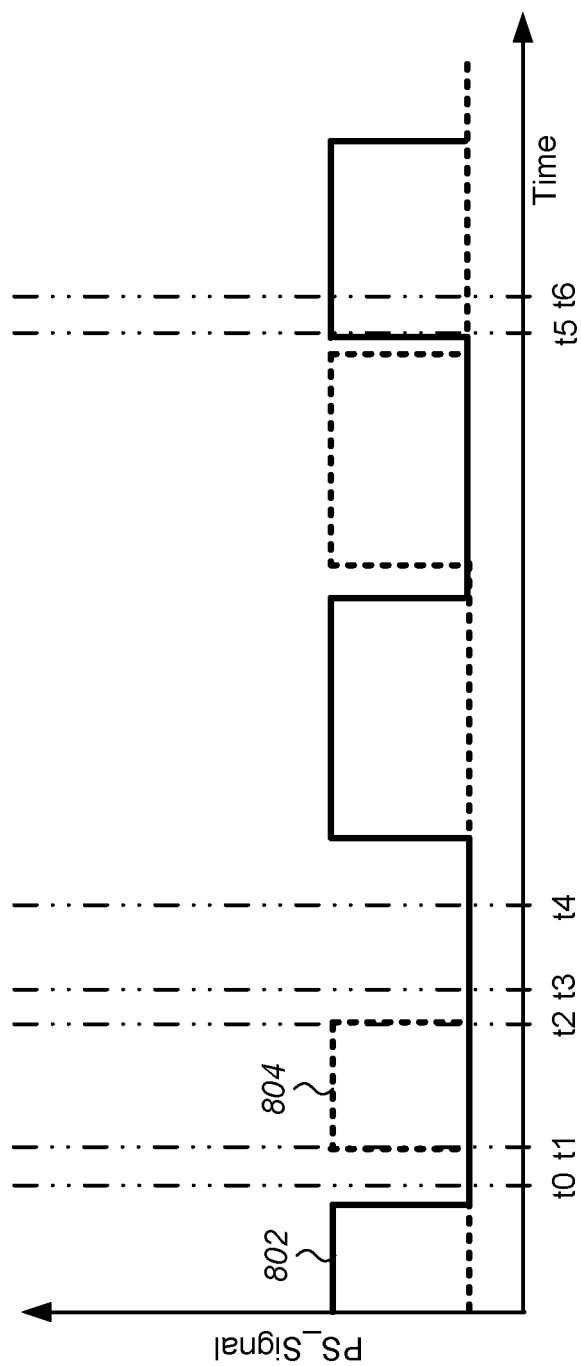
FIG. 8 is a graph showing gate drive signals to a PS and a SR_FET over time in the circuit of FIGS. 6A and 6B as operated by the method of FIG. 7.
Figure 9:
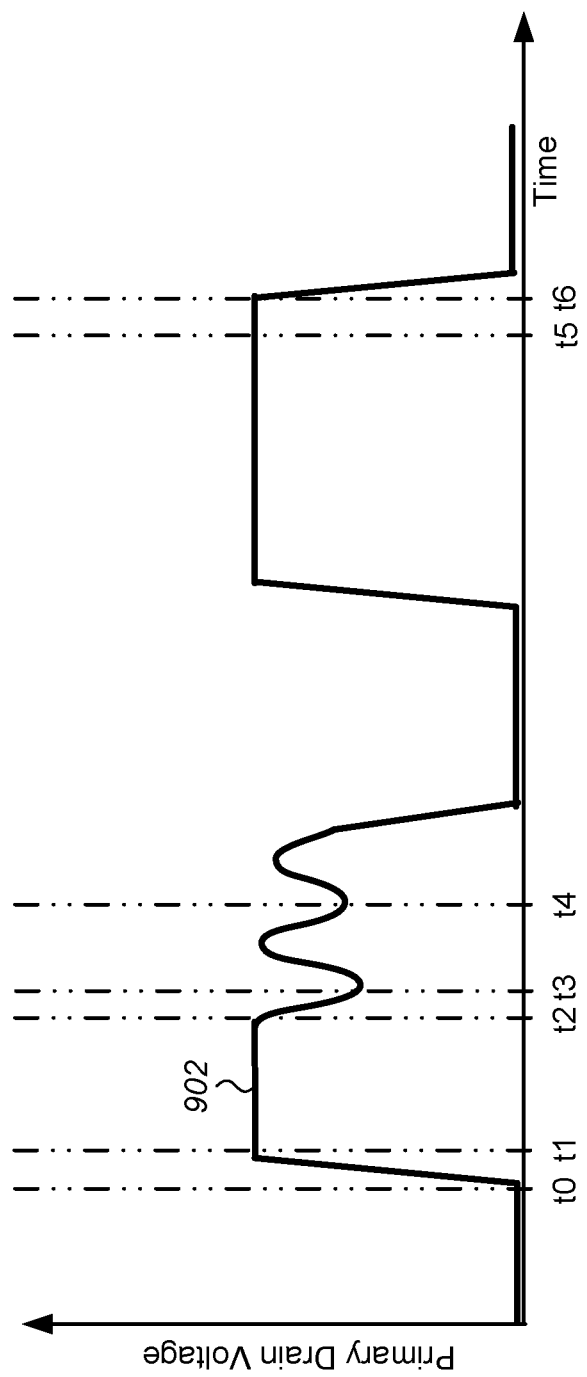
FIG. 9 is a graph showing voltage on a drain node of a PS over time as controlled by the circuit of FIGS. 6A and 6B and operated by method of FIG. 7.

A method for operating a flyback converter including a secondary-side controller will now be described with reference to the flowchart of FIG. 7 and FIGS. 8 through 10. FIG. 8 is a graph showing a gate drive signal 802 to a primary FET or PS and a gate drive signal 804 to a SR_FET or SR in the circuit of FIG. 4 as operated by the method of FIG. 7. FIG. 9 is a graph showing the resulting primary drain voltage 902 on a drain node of the PS over time, and FIG. 10 shows the secondary drain voltage 1002 on a drain node of the SR as sensed by the circuit of FIG. 6 and operated by the method of FIG. 7.

Figure 7:
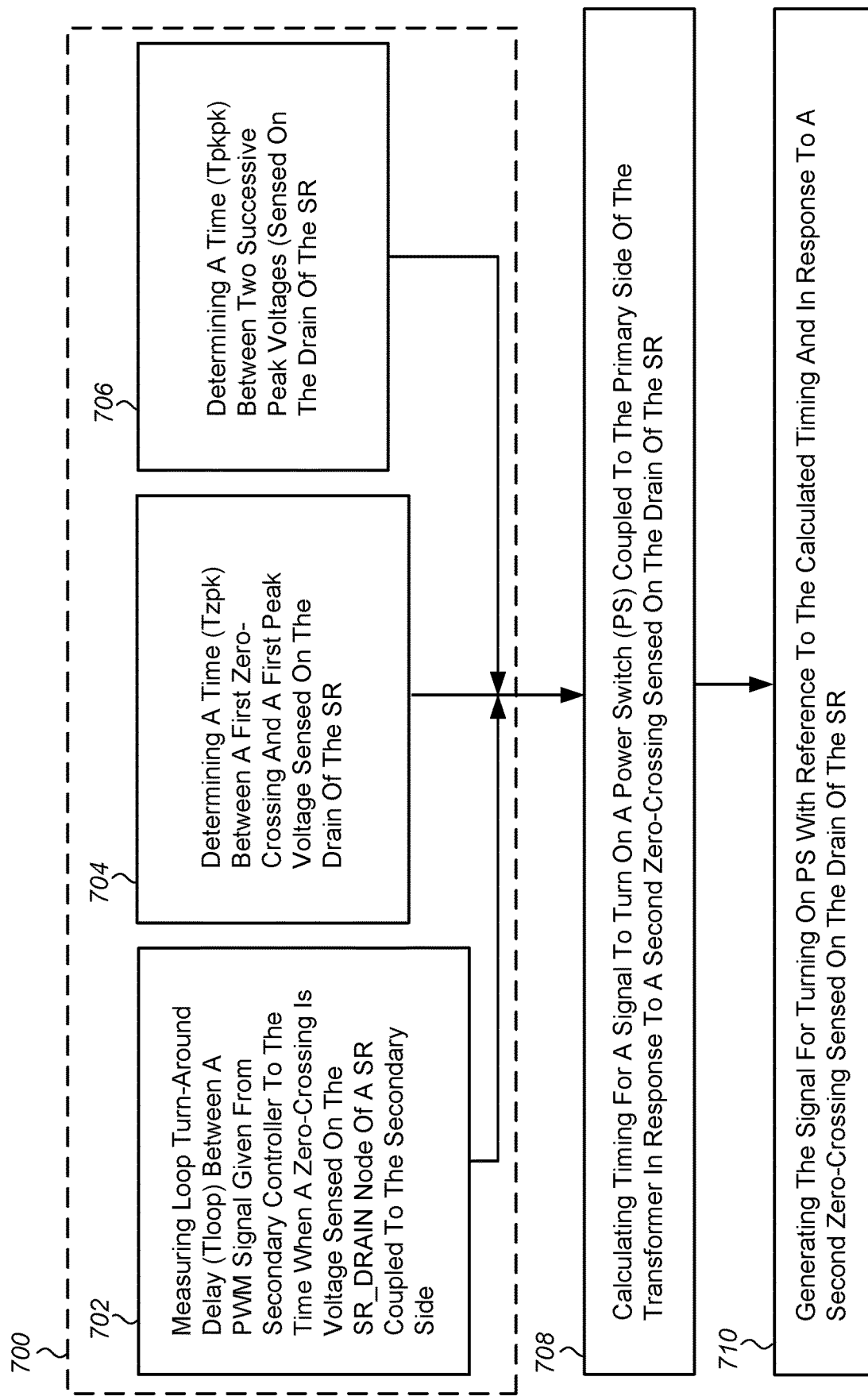
FIG. 7 is a flowchart illustrating a control method for the flyback converter of FIGS. 6A and 6B in accordance with an embodiment of the present disclosure.

Referring to FIG. 7, after powering up the flyback converter the method begins with performing a calibration cycle 700. Generally, the calibration cycle 700 involves at least three steps, which can be performed simultaneously or sequentially in any order. The three steps of the calibration cycle include a first step 702 of measuring loop turn-around delay (Tloop 1004) between a PWM signal given from secondary controller 602 to the time when zero-crossing (ZCD) voltage sensed on the SR_DRAIN node of a SR coupled to the secondary side. Due to SR_DRAIN node going high because of PS 700 turning on in the primary side 606, for example when the secondary controller sends a gate drive signal (802 in FIG. 8) at time t5 it causes the resulting primary drain voltage (902 in FIG. 9) to go down at time t6, which is detected as a zero-crossing (ZCD 1016 in FIG. 10) at time t6 while the flyback converter is operating in a continuous conduction mode (CCM) mode. The three steps of the calibration cycle further includes a second step 704 of determining a time (Tzpk 1006) between a first zero-crossing (ZCD 1008 in FIG. 10) and a first peak voltage (1010 in FIG. 10) sensed on the drain of the SR 626. Finally, a third step 706 of the three step calibration cycle includes determining a time (Tpkpk 1012 in FIG. 10) between two successive peak voltages (for example 1010 and 1014 in FIG. 10) sensed on the drain of the SR.

Referring again to FIG. 7, after the calibration cycle the timing for the signal to turn on the PS is calculated based on Tloop, Tzpk and Tpkpk (step 708), and the signal generated in relation to a most recently sensed zero crossing on the drain node of the SR (step 710) in order to turn-on primary FET (PS) at or very close to the desired number of valley which helps to improve efficiency and performance of the AC-DC flyback converter.

Figure 10:
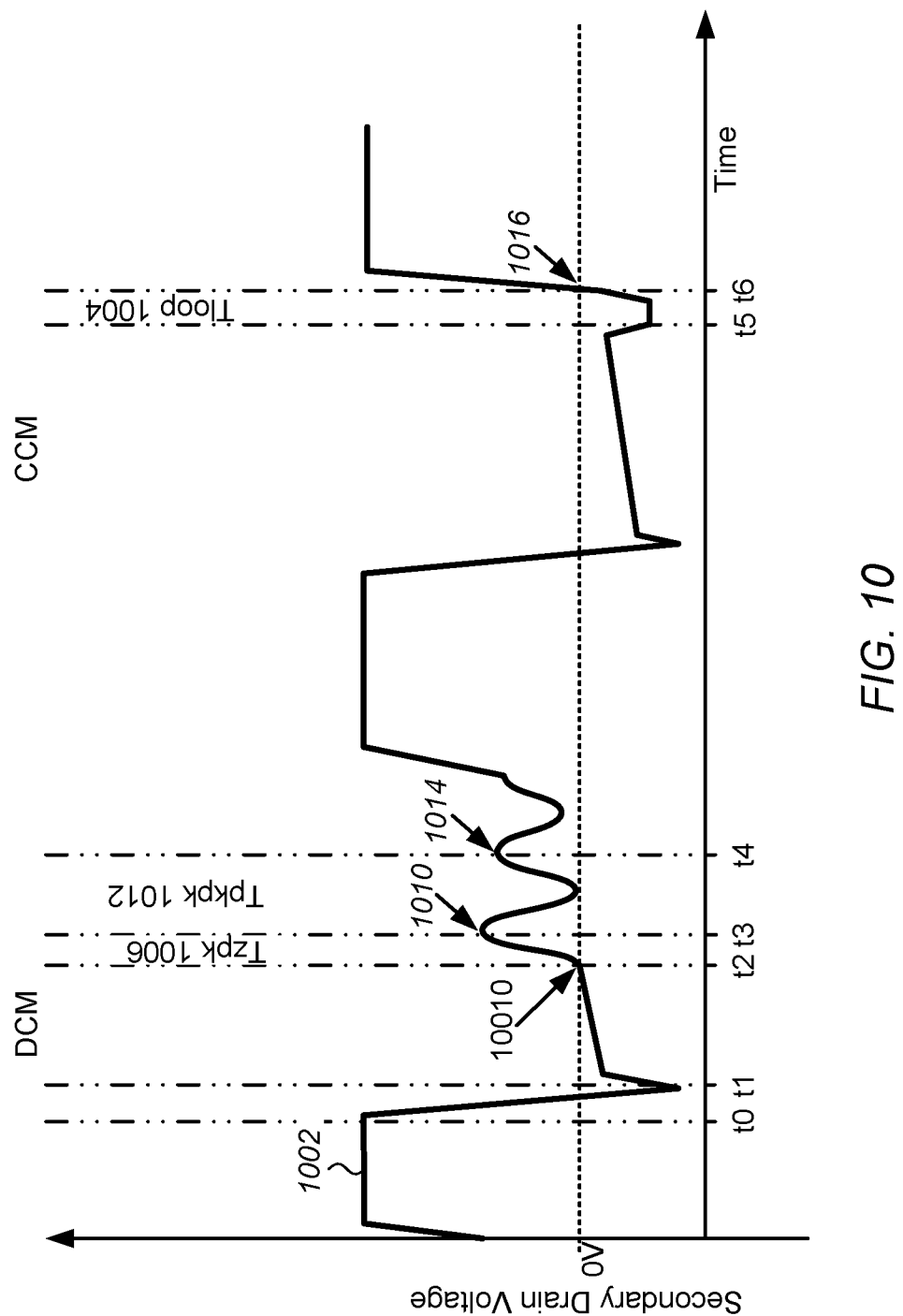
FIG. 10 is a graph showing voltage on a drain node of a SR_FET over time as sensed by the circuit of FIGS. 6A and 6B and operated by the method of FIG. 7.

Referring to FIG. 10, since turning on the PS (primary FET) causes a voltage at the SR_DRAIN node to go up, the loop turn-around delay (Tloop) 1004 can be measured by hardware in the secondary side controller in step 702 by measuring a delay from a time (t5) when the secondary controller sends a gate drive signal (802 in FIG. 8) turning on the PS until a time (t6) when the SR_DRAIN node crosses zero (ZCD 1016 in FIG. 10) while the flyback converter is operating in a continuous conduction mode (CCM) mode.

Similarly, the time (Tzpk 1006) between the first zero-crossing (ZCD 1008 in FIG. 10) at time (t2) and the first peak voltage 1010 sensed on the SR_DRAIN node at time (t3) can be measured in step 704 by hardware in the secondary side controller, and the time (Tpkpk 1012) between two successive peak voltages 1010 and 1014 from time (t3) to time (t4) can measured in step 706. Additionally, it is noted that in some embodiments the calibration cycle 700 can include repeating step 706 a number of times to measure multiple peak-to-peak delays to obtain an average value of the time (Tpkpk) between two successive peak voltages, thereby further improving the accuracy of valley detection in the primary side 606 and the efficiency with which the flyback converter is operated.

In an alternative embodiment, the time between the first zero-crossing and the first peak voltage (Tzpk), and the time between two successive peak voltages (Tpkpk) because the inductor-capacitor (LC) or valley ringing on the primary side following powering on the flyback converter depends on external components having fixed values, i.e., an inductance of the primary side (Lprim) and capacitance of a drain node of a primary FET or PS, the Tpkpk and Tzpk can be calculated or measured for a particular application/converter and given as a input to the memory, such as firmware of the secondary side controller, instead of being measured by hardware in the secondary side controller.

Thus, a flyback AC-DC converter with secondary side control, and SR architecture, and methods for operating the same have been disclosed. Embodiments of the present invention have been described above with the aid of functional and schematic block diagrams illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. An integrated circuit (IC) controller comprising:
a SR-SNS pin to sense a voltage at a synchronous rectifier (SR) on a secondary side of an alternating current-direct current (AC-DC) converter;
a peak-detector block to detect peak voltages that are sensed on the SR-SNS pin;
a zero-crossing detector block to detect when the voltage sensed on the SR-SNS pin crosses zero voltage; and
a calibration block configured to:
measure a loop turn-around delay (Tloop), a time (Tpkpk) between two successive peak voltages detected on the SR-SNS pin, and a time (Tzpk) from when the voltage sensed on the SR-SNS pin crosses zero voltage to when a peak voltage is detected on the SR-SNS pin; and
set timing for a signal to turn on a power switch in a primary side of the AC-DC converter based at least on the Tloop, the Tpkpk, and the Tzpk.

2. The IC controller of claim 1, wherein the SR-SNS pin is configured for a maximum input voltage less than a rectified AC voltage that is input to a secondary side of the AC-DC converter.

3. The IC controller of claim 1, wherein the calibration block is configured to measure the Tloop based on a time when the voltage sensed on the SR-SNS pin crosses zero voltage.

4. The IC controller of claim 1, wherein the calibration block is configured to set the timing for the signal in response to a number of measurements based on the voltage sensed on the SR-SNS pin.

5. The IC controller of claim 1, wherein the calibration block is configured to measure and store the Tpkpk and the Tzpk in memory during operation.

6. The IC controller of claim 1, wherein the Tpkpk and the Tzpk are calculated and stored in memory when the IC controller is manufactured.

7. The IC controller of claim 1, wherein the IC controller is configured to control the AC-DC converter to provide a DC output voltage compatible with a Universal Serial Bus Type-C (USB-C) standard.

8. An alternating current-direct current (AC-DC) converter, wherein the AC-DC converter comprises:
a transformer coupled between a primary side and a secondary side of the AC-DC converter, wherein the primary side is to receive a rectified AC input and the secondary side is to provide a DC output, wherein the primary side includes a power switch, and wherein the secondary side includes a synchronous rectifier (SR); and
a secondary side integrated circuit (IC) controller comprising:
a SR-SNS pin to sense a voltage at the SR on the secondary side;
a peak-detector block to detect peak voltages that are sensed on the SR-SNS pin;
a zero-crossing detector block to detect when the voltage sensed on the SR-SNS pin crosses zero voltage; and
a calibration block configured to:
measure a loop turn-around delay (Tloop), a time (Tpkpk) between two successive peak voltages detected on the SR-SNS pin, and a time (Tzpk) from when the voltage sensed on the SR-SNS pin crosses zero voltage to when a peak voltage is detected on the SR-SNS pin; and
set timing for a signal to turn on the power switch in the primary side based at least on the Tloop, the Tpkpk, and the Tzpk.

9. The AC-DC converter of claim 8, wherein the calibration block is configured to measure the Tloop based on a time when the voltage sensed on the SR-SNS pin crosses zero voltage.

10. The AC-DC converter of claim 8, wherein the calibration block is configured to set the timing for the signal in response to a number of measurements based on the voltage sensed on the SR-SNS pin.

11. The AC-DC converter of claim 8, wherein the calibration block is configured to measure and store the Tpkpk and the Tzpk in memory during operation.

12. The AC-DC converter of claim 8, wherein the Tzpk and the Tpkpk are calculated and stored in memory when the secondary side IC controller is manufactured.

13. The AC-DC converter of claim 8, further comprising a connector compatible with a Universal Serial Bus Type-C (USB-C) standard, wherein the connector is coupled to the DC output.

14. The AC-DC converter of claim 8, further comprising an isolation barrier between the primary side and the secondary side, wherein the isolation barrier comprises one of an opto-isolator and a pulse transformer.

15. A method of operating a secondary side integrated circuit (IC) controller for an alternating current-direct current (AC-DC) converter, the method comprising:
   performing a calibration cycle by the secondary side IC controller, wherein performing the calibration cycle comprises:
      measuring a loop turn-around delay (Tloop) based on a time when a voltage, sensed at a synchronous rectifier (SR) in a secondary side of the AC-DC converter, crosses zero voltage;
      determining a time (Tpkpk) between two successive peak voltages detected at the SR; and
      after measuring Tloop, determining a time (Tzpk) between when the voltage sensed at the SR first crosses zero voltage and when a first peak voltage is detected at the SR;
   for a cycle subsequent to the calibration cycle, calculating timing for a signal to turn on a power switch in a primary side of the AC-DC converter based at least on the Tloop, the Tpkpk, and the Tzpk; and
   in response to detecting a second peak voltage at the SR, generating the signal to turn on the power switch based on the calculated timing, wherein the second peak voltage is detected subsequently to the first peak voltage.

16. The method of claim 15, wherein the Tloop is initially measured following power-on of the AC-DC converter.

17. The method of claim 15, wherein at least one of the Tpkpk and the Tzpk is initially determined following power-on of the AC-DC converter.

18. The method of claim 15, further comprising storing the Tpkpk and the Tzpk in a memory of the secondary side IC controller during operation of the AC-DC converter.

19. The method of claim 15, wherein the Tpkpk and Tzpk are stored in a memory of the secondary side IC controller when the secondary side IC controller is manufactured.

20. The method of claim 15, further comprising retrieving the Tpkpk and the Tzpk from a memory of the secondary side IC controller.

* * * * *